(12) United States Patent
Jannson et al.

(10) Patent No.: US 7,781,739 B1
(45) Date of Patent: Aug. 24, 2010

(54) QUANTUM-IMAGING SYSTEM AND MODE OF OPERATION AND METHOD OF FABRICATION THEREOF

(75) Inventors: Tomasz Jannson, Torrance, CA (US); Ranjit Pradhan, Torrance, CA (US); Michael Gertsenshteyn, Torrance, CA (US); Victor Grubsky, Porter Ranch, CA (US); Igor Marienko, Redondo Beach, CA (US); Gennady Medvedkin, Torrance, CA (US); Wondwosen Mengesha, Torrance, CA (US); Volodymyr Romanov, Torrance, CA (US); Yunping Yang, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 10 days.

(21) Appl. No.: 12/403,639

(22) Filed: Mar. 13, 2009

Related U.S. Application Data

(63) Continuation of application No. 12/046,976, filed on Mar. 12, 2008, now abandoned.

(51) Int. Cl.
*G01T 1/185* (2006.01)
(52) U.S. Cl. .............. 250/370.01; 250/389; 250/336.1
(58) Field of Classification Search ............ 250/370.01, 250/389, 336.1
See application file for complete search history.

(56) References Cited

U.S. PATENT DOCUMENTS

| | | | | |
|---|---|---|---|---|
| 4,227,082 A | * | 10/1980 | Mayeux et al. | 250/336.1 |
| 5,011,280 A | * | 4/1991 | Hung | 356/35.5 |
| 6,947,137 B2 | * | 9/2005 | Sharps | 356/364 |

* cited by examiner

*Primary Examiner*—David P Porta
*Assistant Examiner*—Djura Malevic
(74) *Attorney, Agent, or Firm*—Sheppard Mullin Richter & Hampton LLP

(57) ABSTRACT

A quantum-imaging system for detecting photons, including short-wavelength (<1 nm) photons, is provided. A quantum imaging system can include optical read-out and optical means, and can be configured to perform as both a photon counter and a photon spectrometer. A quantum-imaging system can function as a photon counter and be configured to measure photon beam fluences (e.g., in $J/cm^2$) for both strong beams and weak beams, the latter ones, for example, in the intensity range of 1 $pJ/cm^2$sec, or 0.1 μSv/h. The quantum-imaging system can also function as a photon spectrometer and can be configured to measure photon energies with high energy resolution such as, for example, 1% of photon energy.

52 Claims, 20 Drawing Sheets

QUANTUM-IMAGING SYSTEM AND MODE OF OPERATION AND METHOD OF FABRICATION THEREOF

RELATED APPLICATION

This application is a continuation of and claims the benefit of U.S. patent application Ser. No. 12/046,976, entitled "Quantum-Imaging System and Mode of Operation and Method of Fabrication Thereof," filed Mar. 12, 2008 now abandoned, which is incorporated herein by reference.

TECHNICAL FIELD

The present invention relates to radiation detection, and more particularly, some embodiments relate to measurement of photon fluxes and photon energy for short-wavelength photons (<1 nm), employing an optical read-out configured to provide visualization of secondary electron clouds generated by those photons.

DESCRIPTION OF THE RELATED ART

Many medical, security, and military applications require the capability to measure photon energy in room-temperature environments (or with modest cooling), and photon fluxes for short-wavelength photons (<1 nm). Some applications require that the measurement be obtained from isotopic lines generated by radioactive isotopes such as, for example, $Co^{60}$, or $Co^{57}$, among others. With some measurement systems, quasi-mono-energetic isotopic lines can be used to characterize specific isotopes according to known photon energies and photon fluxes. Accordingly, this form of highly selective identification can allow for isotopic identification, and possibly identification of their sources (medical, military, etc.), and their manufacturers.

It can be important in some applications to measure both photon energies (e.g., by spectrometric techniques) and photon fluxes (e.g., by photon counters), however, conventional measurement devices typically measure one or the other, but not both. Some conventional measurement devices include Geiger-Müller counters, scintillation counters and spectrometers. Additionally, there are various types of semiconductor photon detectors, such as, for example, Germanium detectors. However, these only operate at cryogenic temperatures.

There are, however, some spectrometers that operate at room temperatures. Among spectrometers operating at room temperatures, the most prevalent devices are those based on CdTe and CZT crystals. See, for example, U.S. Pat. Nos. 6,340,812, 6,579,748, 6,946,660, and 7,223,981. However, in order to provide detection operations, these spectrometers rely on an electronic readout, which requires a complex electrode structure arranged across the face of the detector in a matrix to allow the charge distribution of the electrons to be read electronically in two dimensions. This electrode structure, however, is fragile and suffers from significant noise and cross-talk effects. These detectors with such an electrode arrangement do provide electron cloud visualization, but instead rely on the complex electronic structure, which is overly complex and fragile.

In addition, the CdTe/CZT-crystals typically should be rather small to achieve high quality measurements, which compromises photon capture rate defined by photo-absorption. Therefore, the electronic read-out spectrometers based on high energy gap semiconductors such as CdTe or CZT (to operate in room temperature) have quality, reliability, and repeatability problems, which makes production problematic, especially for harsh outdoor conditions.

Pockel cells based on BGO or BSO crystals visualize continuous UV/X-ray images with relatively high energy fluencies from 20 to 60 $uJ/cm^2$ and X-rays in the range <100 keV. Unfortunately, there are several disadvantages in current experimental units based on these crystals. See, for example, Refs. [22-24], listed below. Such disadvantages include the transmission mode of operation, a scanning approach using a single photomultiplier tube (PMT) for detection, and high-intensity scanning He—Ne laser beam with low polarization contrast for readout. Perhaps the most serious drawback is the inability of thin 50 um crystals (necessary for reasonable resolution) to provide high capture volume for absorption of hard X-rays and γ photons (energies >100 keV). Accordingly, such systems are unpractical for photon counting or photon spectrometry.

Additionally, conventional Pockel cells arrangements with optical beam technologies suffer from a variety of shortcomings. See, for example, FIG. 4(d) of Ref [25], which is a conventional arrangement of a PROM device. This reference teaches a PROM device employing two polarizers with their respective polarization axes perpendicular to each other in order to achieve minimum initial transmission (i.e., a conventional, "dark field" readout geometry). If $I_0$ is the uniform intensity of the optical radiation before it enters this conventional arrangement, the intensity of optical radiation $I_{out}(x,y)$ emerging out of this prior art arrangement is given for low intensities by:

$$I_{out}(x, y) = I_0 \sin^2\left[\frac{\Gamma(x, y)}{2}\right] \approx I_0 \frac{\Gamma^2(x, y)}{4} = I_0 \frac{[Cn(x, y)]^2}{4}$$

Because initially, in the absence of the secondary electrons, $\Gamma=0$, $I_{out}(x,y)|_{initial}=0$. The change in transmission, $\Delta T(x,y)$, that occurs in the presence of secondary electrons is proportional to the square of the phase change $\Gamma(x,y)$. The phase change y) is proportional with the electron density $n(x,y)$. This yields the following expression for the transmission change $\Delta T(x,y)$:

$$\Delta T(x, y) = \frac{I(x, y) - I_{ini}}{I_0} = \frac{I_{out}(x, y)}{I_0} = \frac{\Gamma^2(x, y)}{4} = \frac{C^2}{4}n(x, y)^2$$

The inventors have discovered that this natural and obvious arrangement employed in conventional systems, which leads to a square dependence of the signal on the charge density $n(x,y)$ is problematic because the signal for electrons produced by high-energy photons practically vanishes, and the nonlinearity complicates the charge integration, especially for secondary electron clouds of small sizes.

Conventional wisdom teaches structures related to scintillation crystal-based devices, in which secondary electrons generated by X-rays or γ-rays trigger flashes of visible long-wavelength fluencies scattered over the entire volume of the crystal. See for example, U.S. Pat. Nos. 5,171,986, 5,719,400, 6,956,214, 7,132,664, 7,238,942. With these patents, the electrons are generated and scattered over the crystal volume at approximately the speed of light. Accordingly, cloud visualization is effectively precluded.

Another patent, U.S. Pat. No. 4,227,082, "Detector for Detecting Ionizing Radiation," describes a detector that relies on a complex structure of multiple electro-optical crystal plates and electrodes (arranged in a manner analogous to a matrix of pixels). With this device, the crystal properties vary under X-ray or γ-ray stimulation. A plurality of beams are modified in accordance with the crystal properties and multiple photodiodes are used to interrogate the modified beams. This complicated detector is capable only for detecting radiation fluxes, and it has low sensitivity. Extensive scattering prevents high resolution. It does not allow secondary electron cloud visualization, photon counting or photon spectrometry.

The following references are useful to provide background information relevant to the systems and methods described herein. From time-to-time, these references are cited as sources for background material and underlying data. These references are not required reading for an understanding of the manufacture, use function or operation of the embodiments of the invention. The following references are noted herein by corresponding numbers:

REFERENCES

1. Tribute to Emil Wolf: Science and Engineering Legacy of Physical Optics; Tomasz Jannson, (ed.), SPIE Press 2005; in Section: T. Jannson, Physical Optics at Physical Optics Corporation.
2. G. F. Knoll, Radiation Detection and Measurement, $3^{RD}$ Edition, Wiley 2000.
3. J. H. Hubbell and S. M. Seltzer, "Tables of X-ray Mass Attenuation Coefficients and Mass Energy-Absorption Coefficients", NIST, September 2007, http://www.physics.nist.gov/PhysRevData/X-rayMassCoeffElemTab1216.html.
4. M. Born, and E. Wolf, Principles of Optics, $7^{th}$ Ed., Cambridge University Press, 1999.
5. J. Als-Nielsen and D. McMorrow, Elements of Modern X-ray Physics, Wiley, 2001.
6. J. H. Hubbel et al., "Atomic Form Factors, Incoherent Scattering Functions, and Photon Scattering Cross-Sections," *J. Phys. Chem. Ref Data*, vol. 4, no. 3, pp. 471-538, 1975.
7. E. Storm, H. I. Israel, "Photon Cross Sections from 1 keV to 100 MeV for Elements Z=1 to Z=100," *Nuclear Data Tables Academic Press A*7, pp. 565-681, 1970.
8. "X-ray Data Booklet," Lawrence Berkeley National Lab., Univ. of California, Berkeley, p. 5-16, $2^{nd}$ Ed. January 2001.
9. T. Jannson, et al., "Performance Metrics for Integrated Lighting Systems," *SPIE Proc.* 6225B-53, 2006.
10. L. Mandel and E. Wolf, "Optical Coherence and Quantum Optics," Cambridge Univ. Press, 1995.
11. D. Marcuse, "Light Transmission Optics," 2nd Ed., Van Nostrand, Sec. 3.6 Quantum Theory of Light Rays, 1982.
12. T. S. Moss, O. J. Burrell, and B. Ellis, Semiconductor Optoelectronics, Butterworth, London, 1973.
13. Electro-optic Handbook, Burle Electron Tubes, Section 11.1, Image Tubes, 1974.
14. H. Margeneau, and G. M. Murphy, The Mathematics of Physics and Chemistry, R. F. Krieger Publ. Co., N.Y. Section 12.4, 1976.
15. H. J. Scheel, Chapter 1: The Development of Crystal Growth Technology; in Crystal Growth Technology; H. J. Scheel, and T. Fukuda, (eds.), Wiley, 2003.
16. C.-H. Su, "Composition-Temperature-Partial Pressures for $Cd_{0.8}Zn_{0.2}Te$ by Optical Absorption Measurments," *J. Crystal Growth*, vol. 281, no. 2-4, pp. 577-586, 2005.
17. M. Fiederle, et al., "Growth of High Resistivity CdTe and Te(Cd,Zn) Crystals," *Crystal Res. Tech.*, vol. 38, no. 7-8, pp. 588-597, 2003.
18. P. Rudolph, A. Engel, et al., "Distribution and Genesis of Inclusions in CdTe and (Cd,Zn)Te Single Crystals Grown by the Bridgman Method and by the Traveling Heater Method," *J. of Crystal Growth*, vol. 147, no. 3-4, pp. 297-304, 1995.
19. Photorefraction Materials and Their Applications, P. Gunter and J. P. Huignard, (eds.), Springer Series in Optical Sciences, Springer, 2006.
20. D. Bohm, Quantum Theory, Dover Publ., Sec. 21, 1951.
21. W. Shockley, *Appl. Phys.*, vol. 3, p. 635-636, 1938.
22. G. J. Berzins and M. Graser, Jr., "Response of $Bi_{12}SiO_{20}$ Pockels Readout Optical Modulator to X-rays," *Appl. Phys. Letters*, Vol. 34, No. 8, pp. 501-502, 1979.
23. Y. Osugi, A. Honda, S. Tange, S. Toyoda and T. Minemoto, "The Development of New X-Ray Still Image Detector 'XTV-PROM'," SPIE, Vol. 1736, pp. 2-9, 1993.
24. G. H. Stokes, D. M. Stupin, N. E. Elliott and M. Graser, Jr., "Pockels Readout Optical Modulator": An X ray Imaging Detector That Maintains Good Efficiency Over A Broad Energy Range," *Rev. Sci. Instrum.*, Vol. 56, No. 11, pp. 2173-2175, 1985.
25. J. Feinleib and D. S. Oliver, "Reusable Optical Image Storage and Processing Device," *Applied Optics*, Vol. 11, No. 12, December 1972, pp. 2752-2759.

BRIEF SUMMARY OF EMBODIMENTS OF THE INVENTION

According to various embodiments of the invention, a quantum-imaging system for detecting photons, including short-wavelength (<1 nm) photons, is provided. In some embodiments, imaging is provided by optical read-out and optical means, and the system can be configured to perform as both a photon counter and a photon spectrometer. In one embodiment, the quantum-imaging system can function as a photon counter because it can measure photon beam fluences (e.g., in $J/cm^2$) for both strong beams and weak beams, the latter ones in the intensity range of 1 $pJ/cm^2$·sec, or 0.1 μSv/h. The quantum-imaging system can also function as a photon spectrometer because it can measure photon energies with high energy resolution such as, for example, 1% of photon energy.

The quantum-imaging system can be configured as an optical read-out system that measures secondary electron clouds generated by a primary photon, transferred into a spatial pattern. In one embodiment, the spatial pattern formed by the secondary electron cloud is read and transmitted by an optical read-out beam. In contrast to electronic-readout systems, which require complex pixel/electrode structure to measure photon energy, a quantum-imaging system using an optical read-out can be configured to measure short-wavelength photons while avoiding this complex pixel/electrode architecture. Also, as a semiconductor detector working in room temperature, embodiments can be configured using high-quality and large size BGO or BSO crystals such as, for example $Bi_{12}GeO_{20}$ and $Bi_{12}SiO_{20}$, among others. Such crystals can be grown, for example, by the Czochralski method, while their electronic-readout counterparts have to use lower-size CdTe, or CZT crystals, grown by the Bridgman method. Embodiments of the quantum-imaging device can be especially advantageous for measurement of isotopic lines and identification of related isotopes within broad dynamic range and broad photon energy spectrum from 10 keV to a few MeV with a relatively constant spectral resolution of few percent, or even as low as a fraction of a percent. It can be also applicable to security inspection and medical diagnosis, as well as to energy measurement of ionizing particles such as α, β, and γ.

In one embodiment, the present invention provides a new method of photon energy measurement and detection utilizing optical visualization of secondary electron clouds, preferably wherein each secondary electron cloud is generated by a single short-wavelength (e.g., <1 nm) photon. The short-wavelength photons can include, for example, hard X-ray and γ-photons in the photon energy range from about 10 keV to about 1.2 MeV, or even higher. The application range of this device can be extended in some embodiments from γ-radiation to all types of ionizing radiation: α, β, and γ.

In contrast to conventional electronic-readout devices, a quantum-imaging device can be provided that incorporates an optical readout. Accordingly, such a device can be implemented without including the complex pixel/electrode structure that is attached to the crystal in conventional devices. Additionally, in one embodiment the crystal does not need to be CdTe or CZT, and can be made from a variety of birefringent materials including, for example, BGO or BSO, which can be large and still preserve high quality; thus preserving high capture rate, as well as high reliability and repeatability. Accordingly, some embodiments can be attractive for mass production and operation in harsh outdoor conditions. Additionally, in other embodiments, this quantum-imaging device can be configured to operate as both a photon counter and a photon spectrometer.

Embodiments of the quantum-imaging device can be implemented to provide identification of isotopic lines by measurement of both photon fluxes and photon energies. Photon fluxes can be measured for both strong and weak photon beams. In one embodiment, weak photon beams can be measured down to approximately 1 pJ/cm²sec, or 0.1 pSv/h-level. Preferably, the device can be implemented such that photon energies can be measured with high resolution such as, for example, 1% or better, within an energy range of approximately 10 keV to 1.2 MeV. An important advantage that can be obtained by the quantum-imaging system in various embodiments is that it can be implemented to perform as both a γ-counter and a γ-spectrometer, working in room temperature, and in harsh outdoor conditions.

The design of various embodiments of the quantum-imaging system can be based on the following considerations, although after reading this description, one of ordinary skill in the art will understand how to implement the invention with alternative considerations, objectives, or criteria in mind.

The energy range of hard X-rays, or γ-photons is preferably within 10 keV to 1.2 MeV allowing high energy spectral resolution (e.g., about 1%) within this range.

The total dose, or fluence (in J/cm²), or intensity (in J/cm²·sec) can be within a broad range. In some embodiments, for example, the upper range can be very high, and the lower range down to approximately 1 pJ/cm²·sec, or 0.1 μSv/h.

The number of isotopic lines measured simultaneously can approach or even exceed ten, and they can be very dense, especially in lower photon energy range.

The isotopic lines can be measured in both photon fluxes and photon energies. For example, photon energies can be measured in two steps: first approximately, and then, with high precision.

One example operational process of the quantum-imaging system for isotope identification can include a multi-process operation. In this example, the process can begin by applying a variable absorption path method to calculate approximate values of photon energies for isotope spectral lines. This can be accomplished for measured gamma sources, including values of photon fluxes and equivalent fluences. With the approximate values known, a fully-parallel variable absorption path method can be applied to reduce fluences of the spectral lines to desired values. For example, the fluences can be reduced to a level so that their respective packing coefficients will be significantly smaller than unity, in order to avoid overlapping of secondary electron clouds. With properly adjusted packing of secondary electron clouds, the method can utilize secondary electron visualization with an optical readout. This can include optical measurement by quantum imaging in order to obtain precise values of single photon energies with high energy resolution. For example, in one embodiment, the system can achieve up to 1%-energy spectral resolution or even better. Where there is cloud overlap, methods can be employed in various embodiments to identify overlap and allow appropriate visualization of the clouds.

The disclosed quantum-imaging technology can be implemented in one or more various embodiments that can be configured to provide one or more of the below described benefits over current approaches. For example, the quantum-imaging technology might be implemented to include one or more of the following features such as: The ability to work both as a γ-counter and a γ-spectrometer; a structure that can provide imaging and does not use the complex pixel/electrode structure needed for electronic read-out; a BSO or BGO crystal (or other birefringent material) detection device that can be large, while still preserving high quality, thereby maintaining high photon capture rate by photo-absorption—a feature that is important for high device sensitivity. As other examples, in various embodiments the quantum-imaging technology might also be implemented to provide a quantum-imaging system that operates both at room temperature and in harsh outdoor conditions; that has high mechanical stability (for example, because the complex pixel/electrode structure can be avoided); that can provide easy (x,y,z)-volume readout (for example, with embodiments implementing a multi-layer architecture as described below); that has high energy resolution (~1%) across a broad energy spectrum (not only for high energy photons, >500 keV); that can work for a large number (~10) of isotopic lines, in parallel; and is easy to fabricate and provides ease of maintenance and operation with cost-effective components and technologies.

In various embodiments, the quantum imaging system can be scaled to various sizes and form factors for desired applications including, for example, hand-held units, portable or transportable units, desktop or workspace-sized units, and even larger. For example, embodiments of the quantum imaging system can be implemented in portals sized for cargo, human or vehicular passage including, for example, baggage screening and human portals at airport security checkpoints, vehicular checkpoints for secure installations, border crossing points, and so on.

The quantum-imaging system can be implemented in some embodiments to meet the need for real-time isotope identification with high energy resolution, at room temperature, and in harsh outdoor conditions, sensing many isotopic lines in parallel, while some embodiments also offer photon counting. The quantum imaging system can also be implemented for remote or telerobotic operation. Accordingly, embodiments can be provided for implementation in unsafe or "hot" environments such as radioactive sites (e.g., inside nuclear reactors, nuclear waste facilities, uranium mines, etc.

Preferably, the quantum-imaging system can be configured in various embodiments to incorporate highly innovative quantum-imaging techniques based on the visualization of a secondary electron cloud generated by an impinging photon. This feature can be implemented to provide high selectivity. For example, embodiments can be implemented to achieve high energy resolution of isotopic lines or highly precise measurement of relative photon fluxes. This can allow the device to accomplish highly selective identification of isotopic γ-sources.

In another embodiment, a variable absorption path method can be utilized to allow for double checking of photon energy. In yet another embodiment, a multi-layer architecture can be provided. For example, the elimination of the pixel/electrode structure can allow for realization of a multilayer architecture, which can be utilized in various embodiments to detect high energy photons, for example, with energies from approximately 200 keV to 3 MeV, and higher. A multilayer architecture can also allow for both (x,y,z)-photon imaging, and for selectively reducing photon fluxes to avoid or reduce overlap of secondary electron clouds. The use of the several innovative optical read-out techniques can also be provided, some of which are based on or derived from conventional imaging technologies.

There are a large range of potential applications for embodiments of the novel quantum-imaging system disclosed herein. These applications might include, for example, medical evaluation and diagnosis; radiation dosimetery; geophysics applications; nuclear power plant operation, maintenance and waste management; military and Homeland Security inspections; space applications; and so on.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the versatility, scope, or applicability of the invention. It should be noted that for clarity and ease of illustration these drawings are not necessarily made to scale.

Some of the figures included herein illustrate various embodiments of the invention from different viewing angles. Although the accompanying descriptive text may imply or expressly refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for radiation detection. In one embodiment detection of energy, $E_o$, of single γ-photons can be accomplished utilizing optical read-out technologies. One way this is accomplished is through a unification of interdisciplinary sciences, such as: semiconductor physics and optics, photo-refractive optics, materials science, γ-physics, and X-ray physics and optics. Accordingly, in various embodiments, various energetic quantities of those diversified scientific areas can be measured in a unified way, based on universal energy and power units such as the joule (J), erg, and watt (W). In general, in the case of non-coherent electromagnetic beams, such as optical (visible, infrared, UV), XUV, X-ray, and γ-ray, the general laws of classical radiometry can be applied. Moreover, in the case of weak diffraction phenomena, laws of physical radiometry can be applied. The general radiometric units are: power (W), energy (J, erg); 1 J=$10^7$ erg; emissivity, exitance, illuminance, or intensity (W/cm$^2$); fluence (J/cm$^2$); radiant intensity (W/Ster, or W/Sr); and radiance, or brightness (W/cm$^2$Sr). In γ-physics, and X-ray physics, however, "radiation" typically refers to γ-radiation and X-ray radiation. Such applications typically use different units such as: Gray, or 1 Gy=1 J/kg, Sever (Sv), Roentgen (R), or rad. Therefore, in embodiments where an optical beam is used to provide for an optical read-out, or for detection of γ-photons, a unified treatment of all these radiometric quantities is preferred.

Figure 1:
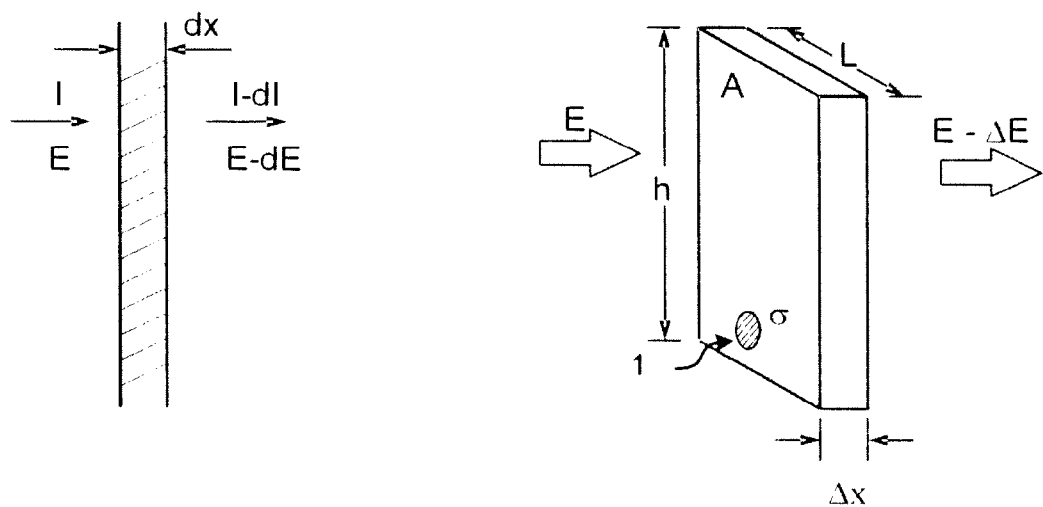
FIG. 1 is a diagram illustrating an example of the attenuation of intensity by material with infinitesimal thickness, dx.

For these unification purposes, consider, as an example, a derivation of the mass attenuation coefficient, denoted here as μ. As given in the NIST Tables (Ref. [3]), it is denoted as μ/ρ, where ρ is material density in g/cm$^3$. Starting from the first principle, consider the attenuation of intensity, I, by a material with infinitesimal thickness, dx, into (I−dI), as shown in FIG. 1. Then, according to Beer's law:

$$\frac{dI}{I} = -\beta dx; \; I = I_o e^{-\beta x}, \tag{1}$$

where $I_o = I(0)$, x is material thickness, and β is linear attenuation coefficient, in cm$^{-1}$, and $$\beta = \rho \mu, \tag{2}$$

which is known for chemical elements and compositions, as a function of photon energy, $E_o$, from 1 keV, to 20 MeV. The photon energy, $E_o$, is:

$$E_o = h\nu = h\frac{c}{\lambda}; \; \lambda = \frac{hc}{E_o}, \tag{3}$$

where ν is the photon frequency, h is Planck's constant, c is the speed of light in a vacuum, and λ is the photon wavelength. Accordingly, $$hc/1 \, ev = 1.24 \, \mu m, \; hc/1 \, keV = 1.24 \, nm \tag{4}$$

where 1 μm=10$^{-3}$ mm, 1 nm=10$^{-3}$ μm, 1 nm=10 Å, 1 eV=1.6·10$^{-12}$ erg, 1 keV=1.6·10$^{-9}$ erg, 1 MeV=1.6·10$^{-6}$ erg=1.6·10$^{-13}$ J.

To show that γ-photons, or hard X-ray photons behave as quants, or quanta, a purely mechanistic derivation of the mass absorption coefficient, μ, can be used, treating those high-energetic photons as particles that collide with atoms. FIG. 1 is a diagram illustrating a simplified model of this phenomenon. Referring now to FIG. 1, the atoms with which the photons collide are represented by circular targets 1, with an area, σ. This is called the total cross-section for a specific attenuation, which can be (for photon energies lower than 1.2 MeV), of three types: photoabsorption, non-coherent (Compton) scattering, and coherent (Rayleigh) scattering. Therefore, the relative (infinitesimal) attenuation fraction (−dI/I), is equal to the ratio of all cross-sections within the volume: Adx, equal to (σnAdx), into the area, A, in the form:

$$-\frac{dI}{I} = \frac{\sigma n A dx}{A} = \sigma n \, dx; \; \beta = \sigma \cdot n, \tag{5}$$

where n is the atom density in cm$^{-3}$. The σ-unit is very small: 1 barn=10$^{-24}$ cm$^2$.

The mechanistic modeling leads to the following formulas:

$$n = \frac{m}{V \cdot m_o}; \; m_o = \frac{M}{N_A}; \; n = \frac{\rho}{m_o} = \frac{\rho N_A}{M}, \tag{6}$$

where m is mass, V is volume, $m_o$ is atom mass in [g], M is atomic mass in [g], and $N_A$ is Avogadro's number: $N_A$=6·10$^{23}$. Substituting Eq. (6) into Eq. (5), yields the following result:

$$\mu = \frac{\sigma \cdot N_A}{M} \tag{7}$$

This confirms that the mechanistic modeling provides the correct results. Further confirmation can be obtained from computing the cross-section formulas using known techniques. For example, Refs. [6-7] tabulate known photon scattering cross-sections.

Because organic elements, such as oxygen, have very strong Compton scattering within 100 keV up to 1 MeV, one should expect almost agreement between the NIST data and known Ref. [6] data, for oxygen, at 100 keV, where, from Ref. [3] it is known that:

$$\mu = 0.155 \frac{cm^2}{g}. \tag{8}$$

However, from Ref. [6], it is known, per atom:

$$\sigma_{coh}=0.1595 \text{ barns}, \sigma_{inc}=3.88 \text{ barns} \tag{9}$$

where $\sigma_{coh}$ is the total cross-section for coherent scattering, and $\sigma_{inc}$ is the total cross-section for non-coherent (Compton) scattering, and: $\sigma_{coh}+\sigma_{inc}=4\cdot10^{-24}$ cm$^2$. Then, because for an oxygen atom, the approximate value of atomic mass is: M=16 g, we obtain:

$$\mu' = 0.15\frac{cm^2}{g}; \; \mu' \cong \mu \tag{10}$$

i.e., those two values are comparable, indeed.

In order to find relation between the optical radiation and γ-radiation units, the mechanistic modeling of FIG. 1 can be considered, in energy units, where by applying Beer's law:

$$\Delta E = E(1 - e^{-\beta_{en} \cdot \Delta x}) = \frac{E}{A}A(1 - e^{-\beta_{en} \cdot \Delta x}) = \tag{11}$$
$$= \varphi \cdot A\left(\frac{1 - e^{-\beta_{en} \cdot \Delta x}}{\beta_{en} \cdot \Delta x}\right)\beta_{en} \cdot \Delta x = \varphi \cdot A \cdot \beta_{en} \cdot \Delta x \cdot K$$
$$= (\varphi \cdot K \cdot \mu_{en})(A \cdot \Delta x \cdot \rho) = \varphi \cdot K \cdot \mu_{en} \cdot \Delta m$$

where φ=E/A is energy flux, or fluence, Δm=ρΔx·A is the mass of ΔV volume, and K is the filling coefficient. The filling coefficient is defined as:

$$K(y) \equiv \frac{1 - e^{-y}}{y}; \; y = \beta_{en} \cdot \Delta x, \tag{12}$$

and $\beta_{en}=\mu_{en}\cdot\rho$, is the energy transfer coefficient, characterizing energy absorbed (transferred) by the material, and K(0)=1. In other words, for small thicknesses, K-coefficient can be ignored (K≅1) and the formula from Eq. (11) becomes:

$$\frac{\Delta E}{\Delta m} = \phi\mu_{en}. \quad (13)$$

This is a well-known formula between ($\Delta E/\Delta m$), which is measured by:

$$1\ Gy=1\ J/kg=10^4\ erg/g;\ 1\ Gy=100\ rads \quad (14)$$

and fluence, in J/cm², represented by the following relations, related to units:

$$[J/kg]=[J/m^2][m^2/kg];\ [erg/g]=[erg/cm^2][cm^2/g] \quad (15)$$

As an example, consider a calculation for a lethal dose in: erg/cm². According to Ref [8], p. 5-16, the lethal dose, defined as an ionizing radiation resulting in 50% mortality in 30 days (without medical help), is 5Gy (500 rads). For the sake of simplicity, one can assume the human body as a parallelepiped, with h=170 cm, L=50 cm, $\Delta x$=20 cm, as in FIG. 1, and approximate human body density to be $\rho$=1 g/cm³ (water). Then, assuming ionizing radiation (which is, in general: $\alpha$, $\beta$, $\gamma$-radiation) as only $\gamma$-radiation, assumed here as mono-energetic, and $E_o$=600 keV, the NIST tables provide that: $\mu_{en}$=0.033 cm²/g. Also, $y=\mu_{en}\cdot\rho\cdot\Delta x$=0.66; K(0.66)=0.73. Then, from Eq. (13), the lethal energy flux or fluence is [50,000 (erg/g)/0.73×0.033(cm²/g)] can be determined as:

$$\phi_L \cong 2\cdot 10^6\ erg/cm^2 = 0.2\ J/cm^2. \quad (16)$$

The lethal intensity, $I_L$, in erg/cm² sec, is the lethal energy flux, divided by some time; e.g., by a one day: 1 day=86,400 sec; thus, $I_L$=23 erg/cm² sec.

Now it is informative to compare this lethal dose with a more natural dose. According to Ref [8], the natural annual U.S. average is 3.6 mSv, including 2 mSv from inhaled radioactivity (radon). Assuming this 2 mSv as only from $\gamma$-radiation, we need to normalize this value into a specific body organ, by N-coefficient, where: N=0.05 (brain, breast, kidney, liver, muscles); N=0.01 (bone surface, skin); N=0.2 (gonads); N=0.12 (colon, lung, stomach), and use formula: x[Sv]=N·x [Gy]. With a conservative assumption: N=1; so, 2 mSv=2 mGy=20 erg/g, compared with 5 Gy for the lethal dose. Now, because K<1 for the human body, a more general formula than Eq. (13) can be used in the form:

$$\frac{\Delta E}{\Delta m}[Gy] = K\cdot\mu_{en}\phi[erg/cm^2], \quad (16)$$

where K=0.73, and $\mu_{en}$=0.033 cm²/g for 600 keV, and $K\mu_{en}$=0.024 cm²/g. Then from Eq. (16), $\phi_N$=833 erg/cm²; i.e., about 2500 less than $\phi_L$. The natural intensity is natural fluency divided by one year or about $\pi\cdot 10^7$ sec (to easily remember); thus, $I_N$=2.65·10⁻⁵ erg/cm²sec.=2.65 pJ/cm² sec.

For further radiometric unification purposes, tabulated in Table 1 is the relation between 1 Roentgen and 1 J/cm².

TABLE 1

X-ray Flux in J/cm² Corresponding to 1 Roentgen (R), as a Function of Photon Energy

| | Photon Energy | | | | |
|---|---|---|---|---|---|
| | 1 keV | 10 keV | 30 keV | 50 keV | 80 keV |
| Fluency [J/cm²] | 2.5 · 10⁻⁹ | 1.8 · 10⁻⁶ | 5.5 · 10⁻⁵ | 2 · 10⁻⁴ | 3.6 · 10⁻⁴ |

| | Photon Energy | | | | |
|---|---|---|---|---|---|
| | 100 keV | 300 keV | 500 keV | 1 MeV | 2 MeV |
| Fluency [J/cm²] | 3.6 · 10⁻⁴ | 3 · 10⁻⁴ | 3 · 10⁻⁴ | 3 · 10⁻⁴ | 3.6 · 10⁻⁴ |

The further basic relation (well-known, but given here, for unification purposes), is the relation between an isotope's activity (given in Curies, where 1 Ci=3.7·10¹⁰/sec) and its mass, given by $$\frac{m}{F} = 1.45 t_{1/2}\frac{M}{N_A}, \quad (17)$$

where F is the isotope's activity in a number of emitted $\gamma$-photons (or other radioactive particles) per second, and $t_{1/2}$ is isotope's half-life-time. Assuming, for example, $t_{1/2}$=1 year=$\pi\cdot 10^7$ sec, M=60 g (typical), and $N_A$=6·10²³, we obtain (m/F)=1.7·10⁻⁴ g/Ci. We see that the larger $t_{1/2}$-value, larger mass, m, of the isotope to achieve a given activity.

For comparison, the natural radiation level is 2 mSv per year, or 2 mSv per 8760 h, or 0.23 $\mu$Sv/h, which is close to typical sensitivity level (0.1 $\mu$Sv/h) of highly-sensitive $\gamma$-detectors. However, 2 mSv is equivalent to 20 erg/g, for N=1, or 2.64 pJ/cm² sec, which is, again, close to typically known geophysical natural radiation levels (1 pJ/cm² sec). (This is because: 20 (erg/g)/[(0.73)(0.033 cm²/g)($\pi\cdot 10^7$ sec)]=2.64·10⁻⁵ erg/cm² sec=2.64 pJ/cm² sec). On the other hand, for specific isotope mass, m, we can determine from Eq. (17), a number of $\gamma$-photons emitted in full solid angle, $4\pi$, per second, equal to F-value; and, at the distance, R, its intensity, I, is $$I = \frac{F}{4\pi R^2} \quad (18)$$

For example, assuming R=1 km, m=1 g, $t_{1/2}$=1 year=$\pi\cdot 10^7$ sec, M=60 g, and $N_A$=6·10²³, we obtain from Eq. (17), F=5910 Ci=2.19·10¹⁴ photons/sec. Now, assuming $E_o$=100 keV, we obtain from Eq. (18), I=1.74·10³ photons/cm² sec, or I=2.78·10⁻⁴ erg/cm² sec (100 keV=1.6·10⁻⁷ erg), which is much smaller than $I_L$=23 erg/cm² sec (assuming lethal dose per 1 day, as in Eq. (16)).

Accordingly, it is useful to operate with both types of units: radiometric-optical, and radiometric-$\gamma$-radiative. This is because the majority of application scenarios related to $\gamma$-radiation are computed in the latter units (Gray, rad, Roentgen, Sever), while for optical read-out purposes the radiometric-optical units (Joule, erg, Watt) are more appropriate. This situation is especially clear in the case of X-ray electronic sources, which usually are characterized by manufacturers in Roentgens/sec without giving photon energy, $E_o$. This creates a challenge because X-ray beams produced by such sources are usually not mono-energetic ones.

Figure 2:
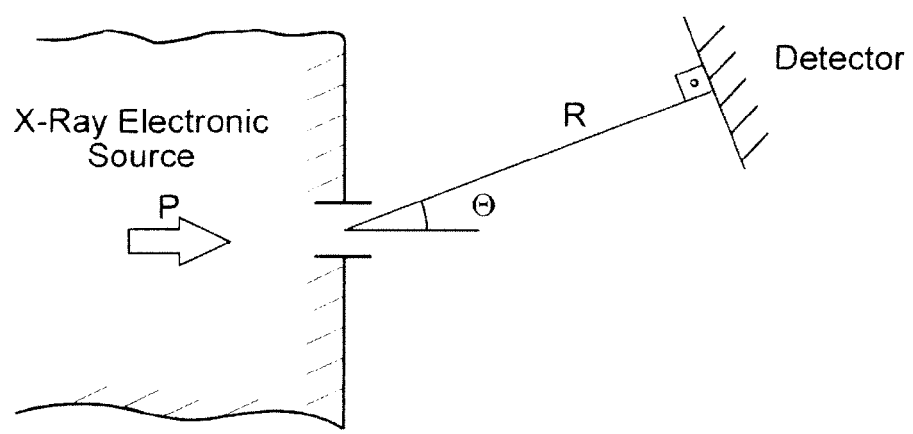
FIG. 2 is a diagram illustrating an example geometry of an electronic X-ray source.

To illustrate this situation, consider X-ray electronic source geometry, as in FIG. 2, with optical power P, and γ-detector, located at distance R, and with a front surface normal to the X-ray beam. FIG. 2 is a diagram illustrating an example geometry of an X-ray electronic source. Referring now to FIG. 2, from general laws of radiometry, the X-ray beam intensity at the detector front surface is $$I_o = \frac{P(n+1)\cos^n\theta}{2\pi R^2}, \quad (19)$$

where $n \geq 1$, and the source is Lambertian for $n=1$. For $n>1$, the source is generalized-Lambertian, with Half-Width-Half-Max (HWHM)-angles, tabulated in Table 2.

TABLE 2

HWHM-Angles for Generalized Lambertian Source

| | | | n | | | |
|---|---|---|---|---|---|---|
| | 1 | 2 | 3 | 4 | 5 | 6 |
| HWHM | 60° | 45° | 37.5° | 33° | 29.5° | 27° |

Eq. (19) is universal and holds for any type of radiation, including γ-radiation and X-ray radiation. For the Lambertian case (n=1), it has the form:

$$I_o = \frac{P\cos}{\pi R^2}. \quad (20)$$

For example, for normal incidence (θ=0), P=1 W, and R=10 cm, $I_o$=3.18 mW/cm². For a 1 sec-exposure of human body with $E_o$=600 keV photons, its energy flux, or fluence is: 3.18 mJ/cm², which is only 63-times lower than lethal dose, of 200 mJ/cm², according to Eq. (16). Therefore, exposing the human body at a 10-cm-distance by this 1 W X-ray source with 600 keV photons for 63 sec, will create the lethal dose. The situation will be even more drastic for lower energy photons; since, according to Eq. (13):

$$\phi = \mu_{en}^{-1} \cdot \left(\frac{\Delta E}{\Delta m}\right), \quad (21)$$

and for lower-energy photons, $\mu_{en}^{-1}$-value will be smaller, while $$\left(\frac{\Delta E}{\Delta m}\right)$$

remains fixed. Accordingly, transforming γ-radiation into optical units gives a fast estimation of the radiation-safety situation.

Embodiments of the invention can be considered as the manifestation of the corpuscular character (or mechanistic character) of high-energy (>1 keV), or short-wavelength (<1 nm), photons that can be named as hard X-ray photons in the 1 keV to 300 keV-range; and γ-photons, for photon energies larger than 100 keV. This distinction between X-ray and γ-photons is arbitrary and is also related to their sources, either radio active isotopes (for γ-photons) or X-ray electronic (e.g., by Bremsstrahlung effect) sources (for X-ray photons). This is why sometimes X-ray photons of energy 100 keV, coming from an X-ray electronic source can have higher energy than that of γ-photons, with energy 80 keV, coming from isotopic source.

The terms: "quant," "quanta," "quants," "quantal," or "quantum" can be interpreted differently in many ways. The name: "quantum optics," for example, is understood in a sense of so-called "second-quantization"—in other words, when electromagnetic radiation is quantized through creation and annihilation operators. The name "quantum mechanics," on the other hand, is typically used in a sense of so-called "first-quantization"—in other words, when mechanical particles become wave packets, as in Schrödinger/Heisenberg wave mechanics; or, in the sense of the Max Born statistical wave function (probability) interpretation. Other statistical/quantum interpretations of optical rays as opposed to particles has been shown by Marcuse in Ref. [11], where classical theory of rays (geometrical optics) has been generalized into a statistical/quantum theory of rays. Here, with respect to various embodiments, "quantum imaging" can be used in the most traditional sense where the objective is to provide optical imaging or detection of short-wavelength/energetic photons, or "quanta." In the sense of quantum imaging, embodiments can be realized in which photons are mechanistically-modeled as in the previous section—see, for example, Eqs. (5)-(6) and FIG. 1.

Figure 3:
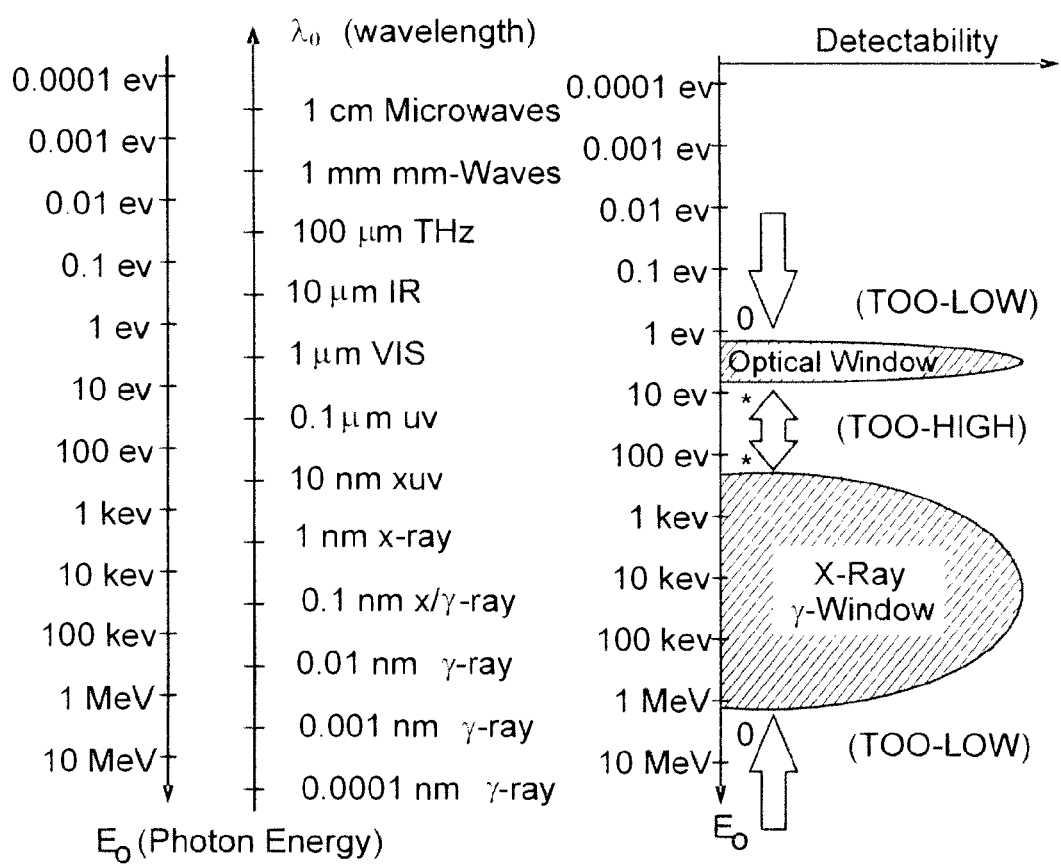
FIG. 3 is a diagram illustrating the detectability of photons as a function of photon energy, $E_o$, and wavelength, $\lambda_0$.

FIG. 3 is a diagram illustrating the concept of the detectability of photons, as a function of photon energy, $E_o$, or wavelength. The mutual relation of these attributes is summarized in Eqs. (3) and (4), where, roughly, the following approximate relations exist:

$$0.001 \text{ eV} \sim 1 \text{ mm}, 1 \text{ eV} \sim 1 \text{ μm}, 1 \text{ keV} \sim 1 \text{ nm}, 1 \text{ MeV} \sim 0.001 \text{ nm}. \quad (22)$$

These approximate relations can be used to provide assessment of the inter-relations between photon energy and wavelength domains. FIG. 3 shows two windows of photon detectability, shaped in the form of two wings—a kind of "Butterfly Effect." These show one "optical" window and the $2^{nd}$, an "X-ray/γ" window. The optical window is in the vicinity of 1 μm-wavelength, and is defined by relation: $E_o > E_g = hc/\lambda_g$, where $E_g$ is the gap energy of a semiconductor material (this is a basic material component of photon detector). The $2^{nd}$ window, which is of greater interest, is the X-ray/γ-window showing detecting X-ray photons and γ-photons in the photon energy range:

$$E_o = (200\text{-}300 \text{ eV, up to: } 1\text{-}2 \text{ MeV}) \quad (23)$$

i.e., starting from soft x-rays, through hard X-rays, into γ-rays.

Figure 4:
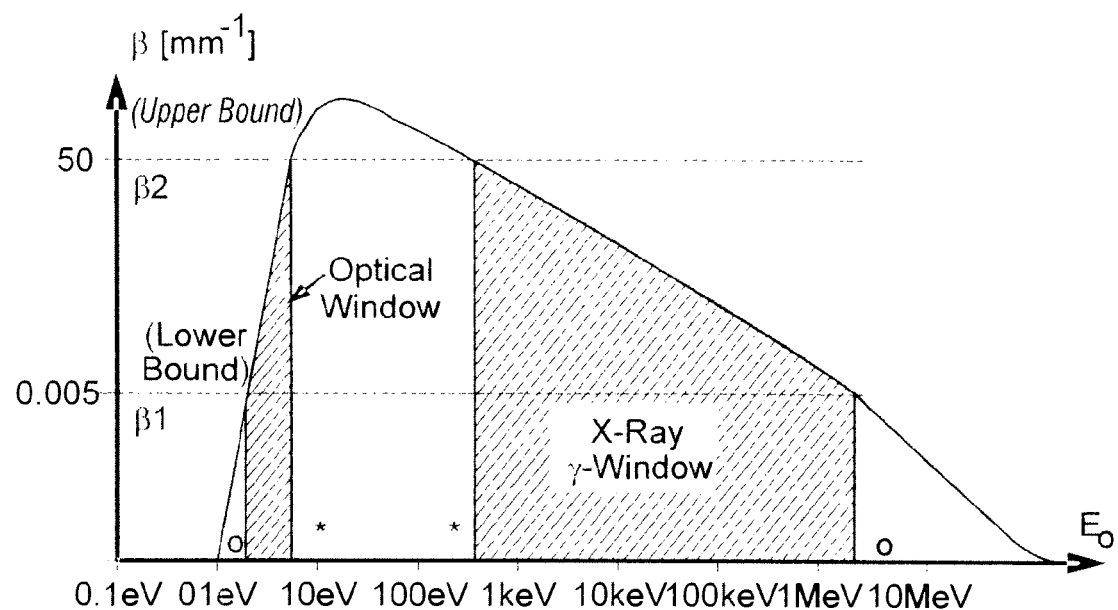
FIG. 4 is a diagram illustrating linear attenuation coefficient values for optical and X-ray/γ-windows.

Both windows are restricted or defined by either too-low-detectability, or too-high-detectability effects, illustrated by linear attenuation coefficient values, as shown in FIG. 4 (described below). The "Butterfly-effect" analogy comes from the mirror-like sequence: "○**○," where "○"-symbol means too low absorption, while "*" means too high absorption.

FIG. 4 is a diagram illustrating linear attenuation coefficient values for optical and X-ray/γ-windows. The "butterfly" sequence "○**○" illustrates a mirror-like pattern. The values $\beta_1$ and $\beta_2$ define upper and lower boundaries. $\beta_2$, defining an upper bound, and $\beta_1$, defining lower bound, are assigned in the following way: $\beta_2^{-1}=20$ μm, and $\beta_1^{-1}=20$ cm. This is, because, $\beta_1^{-1}$-value defines either free-attenuation path mean value $$(\bar{x} = \beta^{-1});$$

or, according to Eq. (11), $$\frac{\Delta E}{E}(x = \beta^{-1}) = 1 - e^{-1} = 0.63 \qquad (24)$$

Therefore, if the average photon free path for a given material is longer than 20 cm, such material cannot be used as an effective photon detector. On the other hand, if the average free path for a given material is smaller than 20 μm, such material cannot be used as an optical mirror material to be transparent for X-ray/γ-photons; thus, precluding the reflection detector geometries for optical read-out.

The concept of quantum imaging in various embodiments is based on imaging of one or more secondary electron clouds generated by low-wavelength photons to be detected. The total cross-section, σ, of a primary photon with energy $E_o$, interacting with matter, in general, and semiconductor detector, in particular, is a sum of four (4) elementary cross-sections:

$$\sigma = \sigma_{ph} + \sigma_{inc} + \sigma_{coh} + \sigma_{pair} \qquad (25)$$

Where: $\sigma_{ph}$, $\sigma_{inc}$, $\sigma_{coh}$, and $\sigma_{pair}$ are cross-sections of four photon interactions: photo-absorption, $\sigma_{ph}$; incoherent (Compton) scattering, $\sigma_{inc}$; coherent (Rayleigh) scattering, $\sigma_{coh}$, and pair-generation (electron-positron) $\sigma_{pair}$. Generally, the latter one is relevant only for $E_o>1.2$ MeV.

For the purposes of quantum imaging, photo-absorption, $\sigma_{ph}$, is of interest. The primary photon upon interacting with matter creates a hot primary electron, which decomposes into lower energy electrons in a number of 1:2 cascade processes. This results in a number, N, of secondary electrons that have energies equal to $R_j$, where $E_j$ is the ionization energy. The ionization energy can vary from material to material, and for BGO is about 16 eV. This ionization energy is decomposed in a thermalization process (by emitting thermal phonons), into a gap energy $E_g$, which is about 4 eV (a high value) for BGO. This basic process is generally accompanied by a number of secondary processes such as Compton scattering, and coherent scattering. However, coherent scattering is typically almost negligible from the perspective of the absorption power budget. In addition, the primary photo-absorption process can create some escape photons. Furthermore, some part of Compton scattering can be converted back to secondary electrons. Finally, even some secondary electrons can create some secondary escape photons through the Bremsstrahlung effect, and also Compton scattering can be partially converted to escape fluorescent photons.

Although all these processes have been described here for reference, an important consideration for quantum imaging according to one embodiment is the number, N, of secondary electrons that can be identified as belonging to a specific, single short-wavelength photon. Assume for example that this number, N, would always be the same for a photon with a given energy, $E_o$, and all the secondary electrons would be detected/imaged. In this ideal case, the problem of quantum imaging would be solved with precision when $\Delta E_o/E_o=0$, where $\Delta E_o$ is photon energy tolerance, assuming the Poisson statistical process to be included. Such a situation can be illustrated by the following equation:

$$\frac{E_o}{E_j} = \frac{E_o'}{E_g} = N = \frac{Q}{e}, \qquad (26)$$

where $E_o$ is primary photon energy, $E_o'$ is primary photon energy after thermalization, equal to the energy sum of all secondary electrons after thermalization, Q is total electrical charge and e is the electron charge.

It should be noted, however, that the number, N, of secondary electrons is typically expected to be a statistical average, or an average over an ensemble of many single-photon realizations. In other words, the number N is actually expected to fluctuate from one realization to another due to the corpuscular nature of short-wavelength photon radiation. Accordingly, one embodiment of the invention provides systems and methods of quantum imaging to minimize or at least reduce the fluctuation of N-value, and, as a result, to minimize or reduce the energy resolution value: $\Delta E_o/E_o$.

For quantum imaging purposes, the shape, or 3-dimensional profile, of the secondary electron cloud can be reduced or made to have only negligible importance where the secondary electron cloud is mapped into some quantum-imaging quantity. Nevertheless, the secondary electron cloud 3D-spatial and 2D-projection distributions are important to understand the quantum-imaging phenomenon used in some embodiments. Therefore, the 3D and 2D visualizations of the secondary electron cloud are important for the quantum imaging processes described herein.

As a starting point, the inventors used a Monte Carlo simulation to visualize two-dimensional and three-dimensional secondary electron clouds, where only primary electrons and primary electron derivatives were available. The inventors anticipated that the cascade trees would be analogous to the primary branch, to obtain the secondary-electron-cloud radius, $R_o$, of a 2-dimensional secondary-electron-cloud projection. As a result of these simulations, the inventors determined that the radius $R_o$, is proportional to the polynomial with powers of $E_o$, where the highest power of this polynomial is in the following form:

$$A_o = aE_o^m \qquad (27)$$

Figure 5:
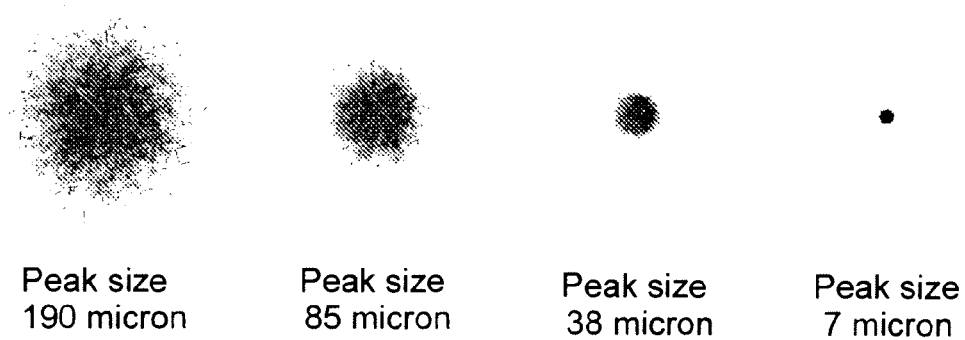
FIG. 5 is a diagram illustrating the Monte Carlo simulation results of four photon energies for BGO.

In Eq. 27, $A_o$ is the 2-dimensional secondary-electron-cloud projection area, a is a proportionally constant, and m is a power value, which is usually in the range from m=2 to m=4. FIG. 5 is a diagram illustrating the Monte Carlo simulation results for four photon energies in BGO. Particularly, FIG. 5 illustrates GEANT4 simulation results for photon energies at 1 MeV, 0.662 MeV, 0.4 MeV, and 0.2 MeV. As illustrated in FIG. 5, the patterns present zigzag electron paths for primary electrons and their primary derivatives, summarized over a large number of statistical paths. The external paths show the bremsstrahlung effect. Because the photoabsorption effect is most important for quantum imaging, the simulation simulated primary electrons as photoelectrons. In general, the secondary electrons are the energetic electrons, known as delta electrons, produced from electron-electron collision. The electrons, however, follow complex zigzag path before final thermalization.

In FIG. 5, the secondary electrons are only shown up to 1 keV. The clouds show only primary electron paths, summarized over satisfied ensemble of many realizations, up to 1 keV. The 3D-shape of the secondary electron cloud, including all electrons produced by the single photon, is assumed to be spherical, with an area $A_o=4\pi R_o^2$, where $R_o$ is the peak size radius. These radii are in FIG. 5: 190 μm, 85 μm, 38 μm, and 7 μm. Eq. (27) is an approximate generalization of these values, for corresponding pairs: $E_o(A_o)$, shown in FIG. 6.

Figure 6:
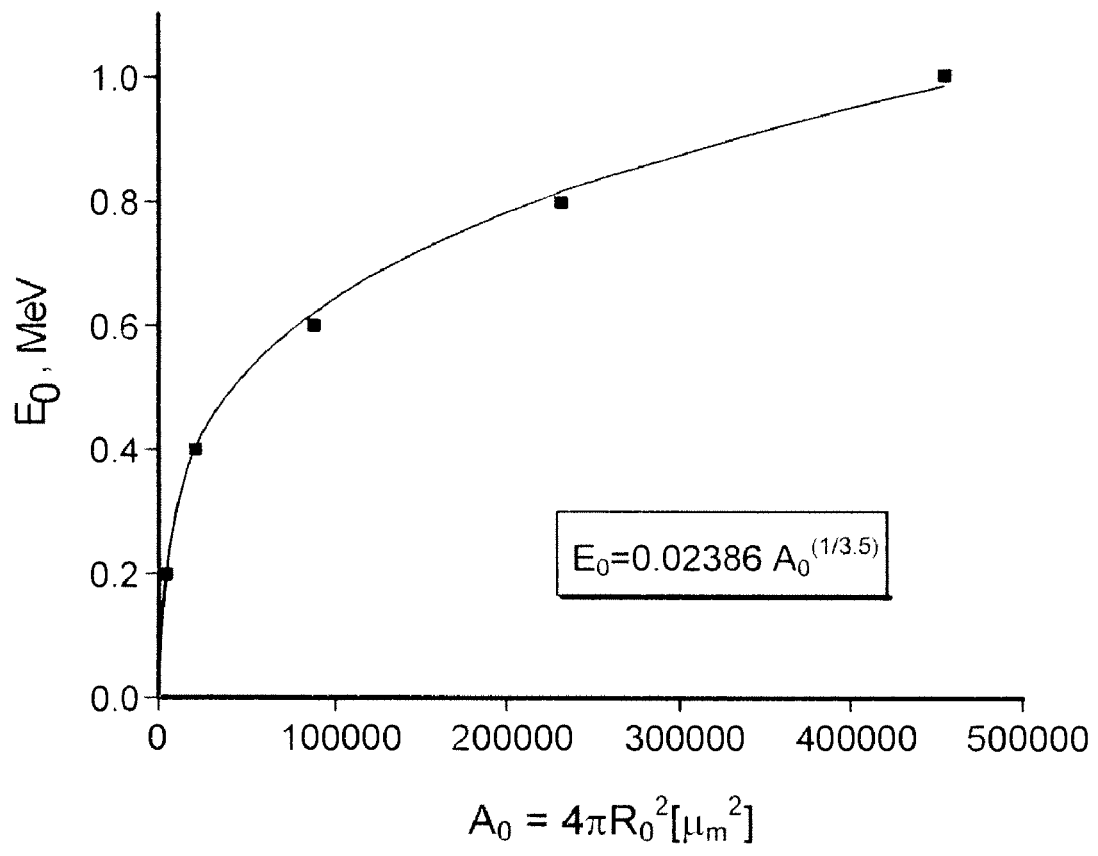
FIG. 6 is a diagram illustrating the experimental dependence $E_o(A_o)$ for the described Monte Carlo simulation of FIG. 5.

FIG. 6 is a diagram illustrating the experimental dependence $E_o(A_o)$ for the above-described Monte Carlo simulation where the squares show simulation results. The pairs will agree with Eq. (27), for m=3.5, with 3% accuracy for the three (3) highest energy values.

These simulated $R_o$ values have been used to visualize the secondary electron clouds for four isotopes: $Ba^{133}$, $Co^{57}$, $Co^{60}$, and $Eu^{154}$. The gamma-lines of each isotope have been denoted as: $E_1$, $E_2$, $E_3$, etc. starting from the largest photon energy. Thus, for example, for isotope $Co^{57}$, the photon energies, are: $E_1$=0.136 Mev, $E_2$=0.122 MeV, and $E_3$=0.014 Mev. The secondary electron cloud radii are: $R_1$, $R_2$, $R_3$, respectively, obtained from simulation curves illustrated in FIG. 6. Because the photoabsorption effect is discussed in terms of the specific material (BGO), it is useful to include the probabilities of decay and the absorption coefficients. As a result, the photon numbers, $N_1$, $N_2$, $N_3$, are obtained within an arbitrarily chosen area A. The gamma lines' fluences: $F_1$, $F_2$, $F_3$, can be computed using the relationship $F_1=N_1E_1/A$, etc.

Figure 7:
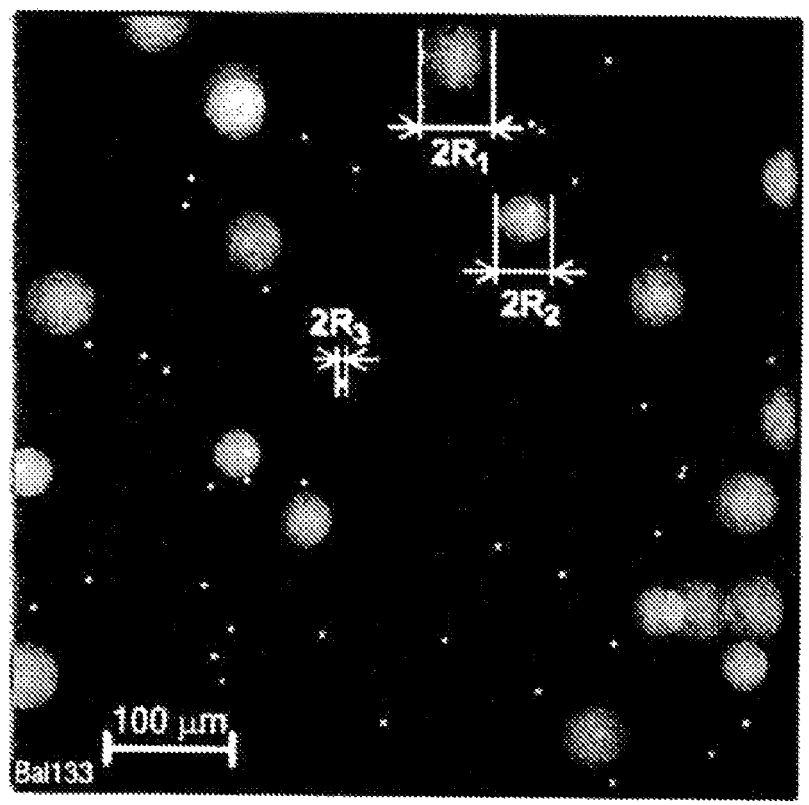
FIG. 7 is a diagram illustrating a visualization of secondary electron clouds for $Ba^{133}$ with three gamma isotope lines.

FIGS. 7, 8, 9, 10, 11, are diagrams illustrating visualizations of these results, where the secondary electron clouds have been visualized for four (4) isotopes, as well as for a fictional situation when all fluences are the same. The latter figure is shown to demonstrate characteristic dependence of the secondary electron cloud packing coefficient, p, on photon energy, $E_o$. FIG. 7 is a diagram illustrating a visualization of secondary electron clouds for $Ba^{133}$ with three gamma isotope lines, where: $R_1$=39.76 μm, $R_2$=31.22 μm, $R_3$=4.31 μm; $E_1$=356 keV, $E_2$=303 keV, $E_3$=81 keV; $F_1$=3.97·10$^{-9}$ J/cm², $F_2$=3.38·10$^{-10}$ J/cm², $F_3$=6.62·10$^{-11}$ J/cm².

Figure 8:
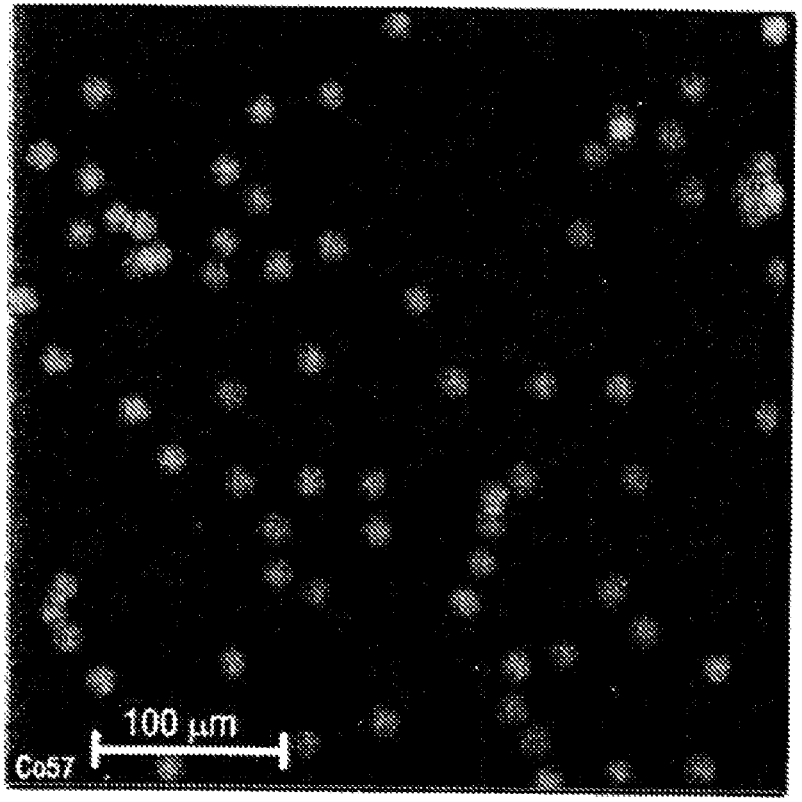
FIG. 8 is a diagram illustrating a visualization of secondary electron clouds for $Co^{57}$, with three gamma isotope lines.
Figure 9:
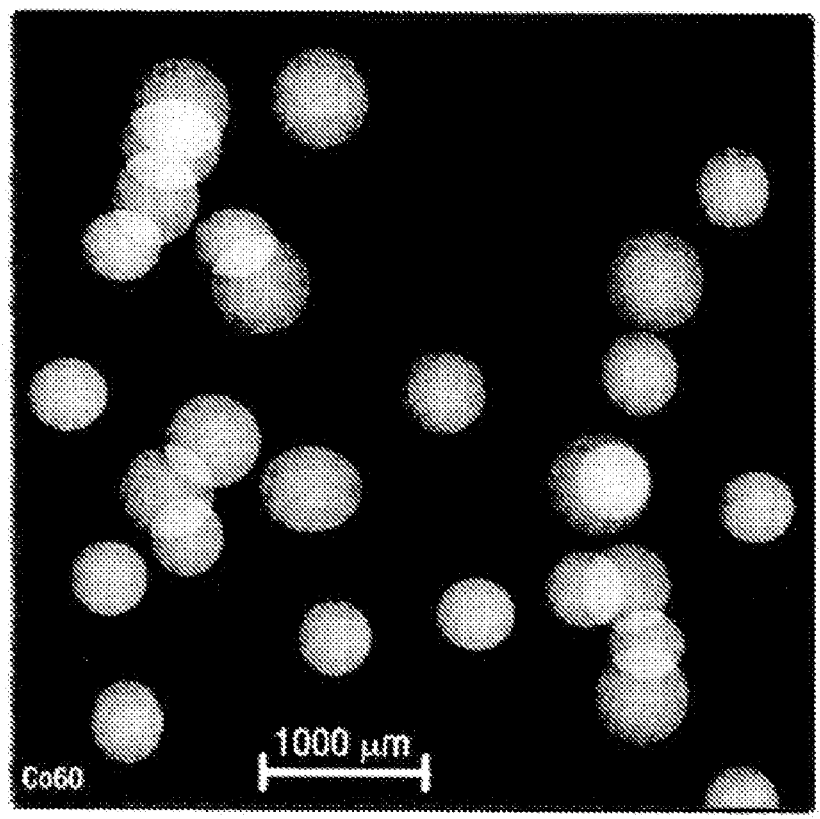
FIG. 9 is a diagram illustrating a visualization of secondary electron clouds for $Co^{60}$, with two gamma isotope lines.
Figure 10:
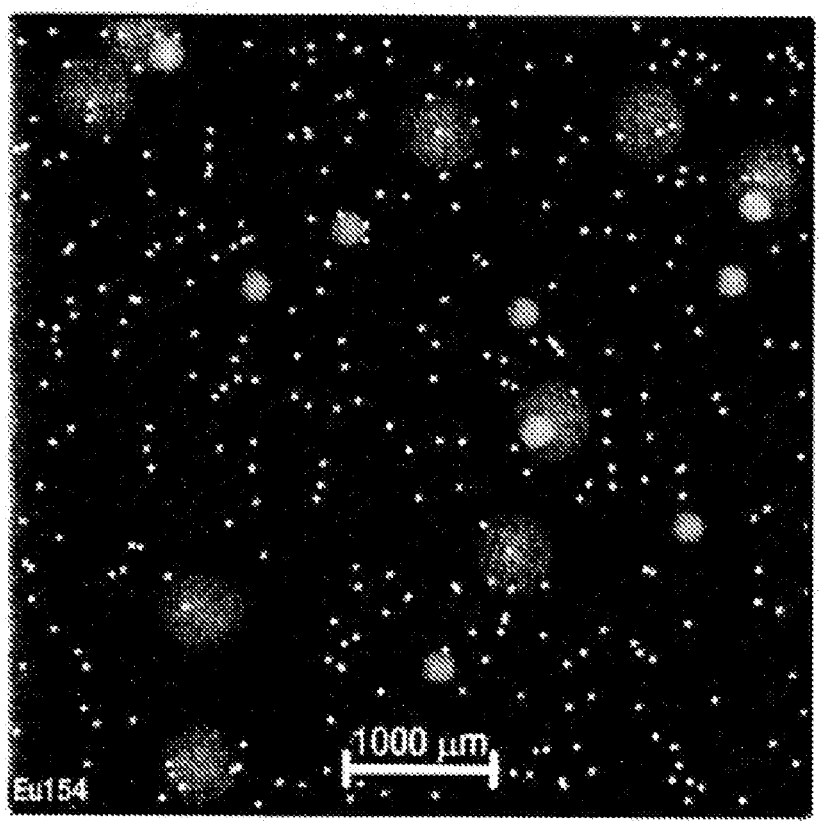
FIG. 10 is a diagram illustrating a visualization of secondary electron clouds for $Eu^{154}$, with three gamma isotope lines.
Figure 11:
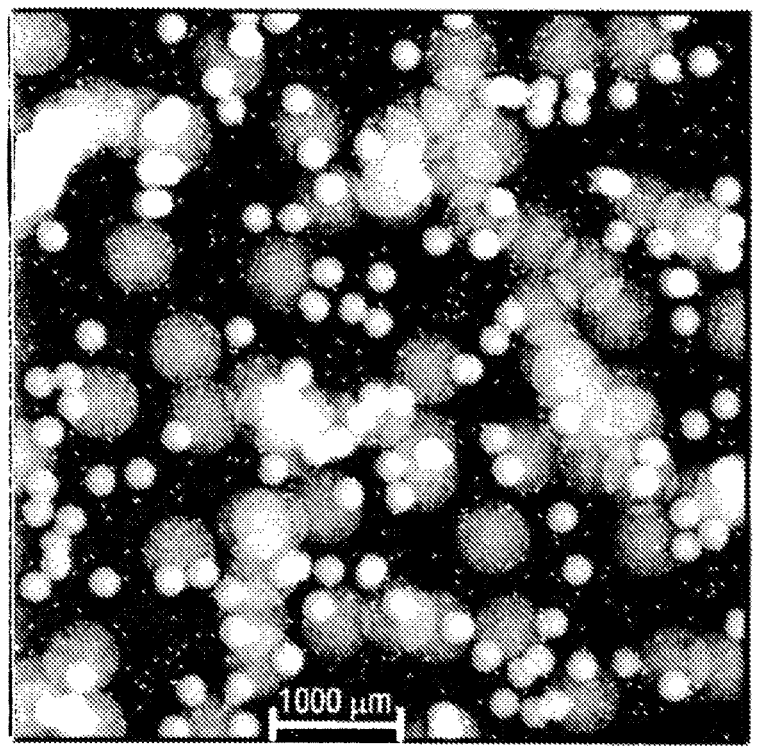
FIG. 11 is a diagram illustrating a visualization of secondary electron clouds for three hypothetic isotope lines with identical fluences ($F_1=F_2=F_3$), demonstrating the packing coefficient effect.

FIG. 8 is a diagram illustrating a visualization of secondary electron clouds for $Co^{57}$, with three gamma isotope lines, where: $R_1$=5.93 μm, $R_2$=4.98 μm, $R_3$=0.32 μm; $E_1$=136 keV, $E_2$=122 keV, $E_3$=14 keV; $F_1$=1.63·10$^{-10}$ J/cm², $F_2$=1.22·10$^{-10}$ J/cm², $F_3$=1.26·10$^{-11}$ J/cm². FIG. 9 is a diagram illustrating a visualization of secondary electron clouds for $Co^{60}$, with two gamma isotope lines, where: $R_1$=257.8 μm, $R_2$=321.6 μm; $E_1$=1332 keV, $E_2$=1173 keV; $F_1$=1.77·10$^{-12}$ J/cm², $F_2$=3.32·10$^{-12}$ J/cm². FIG. 10 is a diagram illustrating a visualization of secondary electron clouds for $Eu^{154}$, with three gamma isotope lines, where: $R_1$=297.5 μm, $R_2$=110.4 μm, $R_3$=4.9 μm; $E_1$=1274 keV, $E_2$=723 keV, $E_3$=122 keV; $F_1$=7.08·10$^{-12}$ J/cm², $F_2$=3.01·10$^{-12}$ J/cm², $F_3$=2.23·10$^{-11}$ J/cm². FIG. 11 is a diagram illustrating a visualization of secondary electron clouds for three hypothetic isotope lines with identical fluences ($F_1=F_2=F_3$), demonstrating the packing coefficient effect where: $R_1$=297.5 μm, $R_2$=110.4 μm, $R_3$=4.9 μm; $E_1$=1274 keV, $E_2$=723 keV, $E_3$=122 keV; $F_1=F_2=F_3$=2.23·10$^{-10}$ J/cm².

The secondary-electron-cloud packing coefficient is defined as $$p_O \equiv \frac{N_O a_O}{A}. \tag{28}$$

For a specific isotope line, with photon energy $E_o$, photon number, $N_o$, and the secondary electron cloud area, $A_o=4\pi R_o^2$. Since, the fluence for specific isotope line is defined as: $F_o=N_oE_o/A$, we obtain, from Eq. (27);

$$\frac{p_O}{F_O} = \frac{A_o}{E_o} = aE_o^{m-1}. \tag{29}$$

Assuming m=3.5, we obtain: $p_o/F_o=aE_o^{2.5}$. In other words, the packing coefficient to fluence ratio is a quantity that is growing with photon energy $E_o$. If the case of $p_o$=1 is considered to be the full-packing condition, the full-packing effect can be easier achieved by photons with higher energy, even assuming the same fluence, $F_o$, as seen in FIG. 11.

One basic goal of quantum imaging that can be achieved according to some embodiments is to measure short-wavelength photon energy, $E_o$, by the secondary-electron-cloud visualization. Preferably, this can be done with a high enough accuracy, $\Delta E_o$, such that:

$$\left(\frac{\Delta E_o}{E_o}\right) = \text{minimum} \tag{30}$$

In such a case, not only photon energies of isotope's specific gamma-radiation quasi-mono-energetic (QME)-lines can be measured, but also an identification of their manufacturers can be provided. Accordingly, in some embodiments the quantum-imaging system can be implemented to realize a kind of super-gamma-spectroscopy. In addition, embodiments of the quantum-imaging detector could work as a γ-counter for both strong and weak γ-fluxes, the latter one down to the range of 1 pJ/cm²sec in various embodiments. Therefore, the quantum-imaging detector can be implemented in some embodiments as either or both a super gamma spectrometer and a gamma counter.

In various embodiments, the principal basis of quantum-imaging detection is the secondary-electron-cloud visualization, which can be realized, for example, by optical recording and detection of the spatial distribution of secondary electron clouds. This can be accomplished in one embodiment by transferring the electron spatial pattern in the device into a spatial pattern-propagating optical beam of low-energy photons (~1 eV), either visible, or infrared (IR). This pattern transfer process is referred to as an optical readout, and can be accomplished using any of a number of different optical means. Additionally, in some embodiments, conventional optical means such as for example, Pockel's effect, image tube, phosphor screen, and many others, can be adapted for use in optical readout in a quantum imaging system.

In addition to the secondary-electron-cloud visualization, it is useful in some embodiments to provide a sufficiently high probability of photoabsorption, where, according to Eq. (11), the probability of photoabsorption, q, for a material with linear attenuation coefficient, β, and thickness, d is given by $$q=1-e^{-\beta d} \tag{31}$$

In order to calculate the photoabsorption area for which the probability of photoabsorption is, say, 99%, the binomial distribution can be applied (for example, as discussed in Ref [14]) in the form:

$$W_n(m) = \binom{n}{m} p^{n-m} q^m; \quad p+q=1, \tag{32}$$

where p is the probability of no-absorption per channel, and n is the number of channels. Accordingly, the probability that at least one photon will be photoabsorbed by n-channels, is $$Q = 1 - W_n(0) = 1 - p^n. \quad (33)$$

It can be assumed for the sake of discussion, as an example, that q=0.3, and p=0.7. Under this assumption, $W_{16}(0) = (0.7)^{16} = 0.0033$, and Q=0.9967>0.99. Accordingly, for n=16, the probability of photoabsorption of at least one photon is slightly larger than 99%. For BGO and $E_o$=600 keV, $\beta_{PHOTO} \cong 0.4$ cm$^{-1}$, and for d=1 cm, q=0.33, p=0.67; for d=5 mm, q=0.18, and p=0.82; and for d=2 cm, q=0.5, p=0.5; so, corresponding Q-values, are Q=0.998, for n=16; Q=0.998, for n=32; and Q=0.996, for n=8.

In Table 3, the capture volumes, defined as material volumes, are tabulated for three (3) thicknesses (5 mm, 1 cm, and 2 cm) for BGO, and an $E_n$=600 keV, such that the probability of photon absorption is slightly larger than 99%. For a 1 mm$^2$-channel area, it can be seen that all three cases are practically the same—equal to 160 mm$^3$, which is about half-volume of typical BGO crystal, with sizes: 3 cm×2 cm×0.5 mm=300 mm$^2$. Similar procedure could be applied for other crystal sizes, using multi-layer architecture.

TABLE 3

Capture Volumes for BGO and $E_o$ = 600 keV

| | | | |
|---|---|---|---|
| d (thickness) | 5 mm | 1 cm | 2 cm |
| q (probability of capture for single channel) | 18% | 33% | 50% |
| p = 1 − q | 82% | 67% | 50% |
| n-channel number for Q (>99%) | 32 | 16 | 8 |
| Total area (assuming 1 mm$^2$-per channel) | 32 mm$^2$ | 16 mm$^2$ | 8 mm$^2$ |
| Capture volume | 160 mm$^2$ | 160 mm$^2$ | 160 mm$^2$ |

In order to calculate a detector sensitivity, consider very low radiation intensity close to the natural radiation level of 1 pJ/cm$^2$sec. For $E_o$=600 keV, this is roughly equivalent to about 10 photons/cm$^2$sec, or 0.1 photons/mm$^2$sec, or 1 photon/mm$^2$ for 10 sec. In other words, this is, on average, approximately 1 photon per 1 mm$^2$, per 10 sec. However, according to Table 3, for 5 mm-thickness, the probability of 1 photon-capture per single 1 mm$^2$-channel, is only 18% and increasing this probability to 99% requires increasing detector surface to 32 mm$^2$. Therefore, the crystal size is an important factor in determining semiconductor detector sensitivity, in general, and BGO-detector sensitivity, in particular.

A variety of semiconductor materials can be used as the detector material for the quantum-imaging detector. Materials such as BGO, BSO, CdTe, CZT (zinc-cadmium telluride), and other crystals and birefringent materials can be used as suitable quantum-imaging-detector materials. All these materials have a high energy gap (for example, $E_g$>3 eV), which allows in many applications detection at room temperature without significant thermal (phonon) noise. Other materials can be considered such as, for example, silicon, germanium or sillenite crystals, and others. The known Czochlarski method (Ref. [15]) is applicable to such crystal growth, as well as to BGO (and, more specifically, to $Bi_{12}GeO_{20}$), and other perfect crystals showing an isotropic crystal structure. All these crystals have relatively low vapor pressure above the melt at growth temperatures, therefore their chemical composition remains satisfactory during the Czochralski growth process and this results in high-quality crystals with large sizes, such as 10 cm×10 cm×1 cm, or even larger. The growth temperature usually exceeds 1000° C. in the reactor chamber, and the modest pressure of gaseous components is the main point in advancing high-quality single crystals.

In contrast, cadmium tellurite (CdTe) and CZT crystals can be typically grown as qualitative single crystals using the Bridgman method, which leads to crystals with not enough big in diameter for quantum-imaging applications. The major reason for this is high cadmium vapor pressure at elevated temperatures (1.55 atm at T=1140° according to Ref. [16]), that prevents the use of Czochralski techniques, as in the case of silicon and BGO. The Bridgman method is preferable (and well developed) to resolve the high-pressure problem however, only in small volumes (as confirmed in Ref. [17]), yet in relatively high growth rates of about mm per hour. The traveling heater method (THM), on the other hand, provides good technological conditions but its growth rate is very low, about mm a day (as confirmed in Ref [18]). For BGO and BSO crystal growth, the container is made of iridium and the melting and growth are carried out under a neutral or week oxidizing atmosphere. Such conventional BGO and BSO crystal growth techniques are well known to those of ordinary skill in the art as evidenced by Ref. [19].

Figure 12:
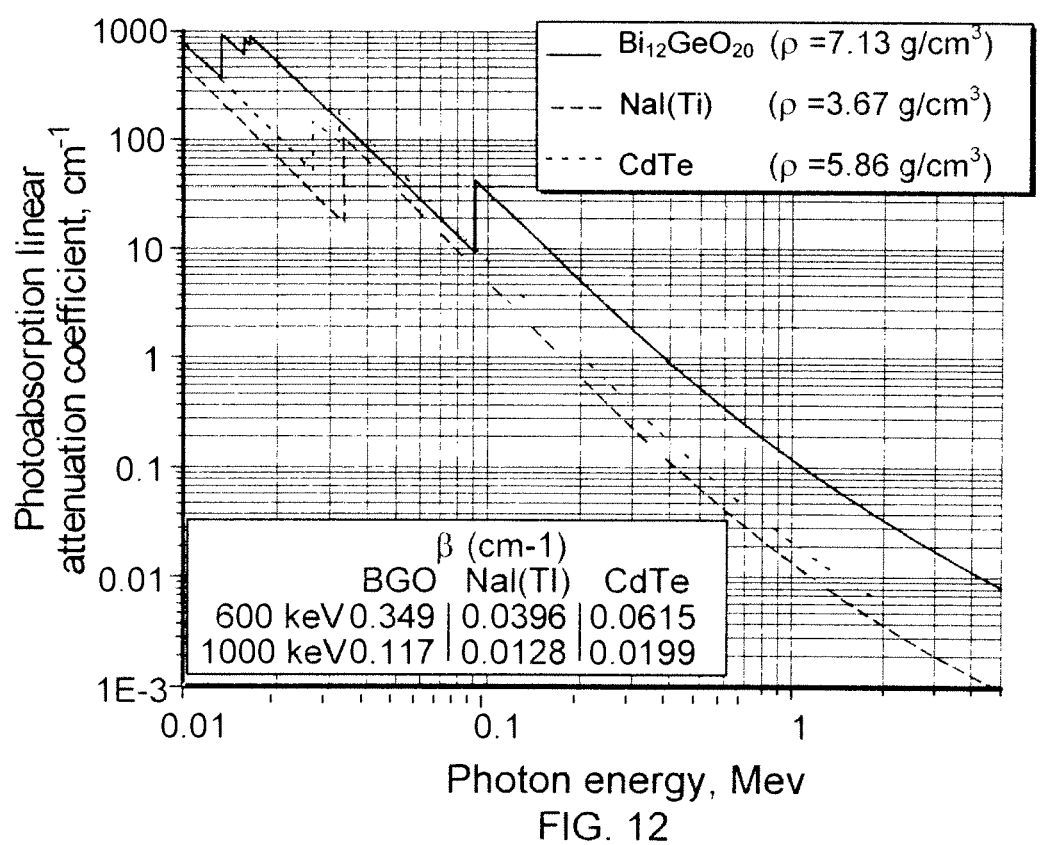
FIG. 12 is a diagram illustrating photoabsorption linear attenuation coefficient dependence vs. photon energy, $E_o$, for BGO, CdTe, and NaI (Tl).

For the quantum imaging purposes, the quantum-imaging detector material preferably utilizes high-quality, high-density, and high-Z components, in order to have a sufficiently high photoabsorption linear attenuation coefficient. It is also preferably large enough to preserve a high capture volume. Also, it preferably has a very low density of volume traps, or those volume traps should be very shallow. One example of such a material is $Bi_{12}GeO_{20}$ (a kind of BGO), with ρ=9.2 g/cm$^3$. FIG. 12 is a diagram illustrating photoabsorption linear coefficient dependence vs. photon energy, $E_o$, for BGO, CdTe, and NaI (Ti). In FIG. 12, β-coefficients, in cm$^{-1}$, for BGO have been summarized for photon energy range from 10 keV to over 1 MeV. This BGO material has been compared with other popular materials such as CdTe and NaI (Tl).

In some embodiments, the quantum-imaging detector can function as a gamma counter. For purposes of discussion, assume a monochromatic (mono-energetic) photon gamma source, with a photon energy, $E_1$, used to detect a number of photons per cm$^2$, $N_1$. The device's fluence, $F_1$, can be given by the expression $F_1 = E_1 N_1$, and its intensity, $I_1$, by $I_1 = \dot{F}_1$, where the dot above the $F_1$ denotes a time differential. The number of photons photoabsorbed by the crystal with a density, ρ, a photoabsorption mass coefficient (in: cm$^2$/g), μ, and a thickness, Δx, is $$N_1' = N_1(1 - e^{-\mu\rho\Delta x}) \quad (34)$$

For BGO, ρ=9.2 g/cm$^3$, and the absorbed fluence, denoted here as $E_1'$, is $$E_1' = E_1 N_1(1 - e^{-\mu\rho\Delta x}) \quad (35)$$

From the NIST tables (Ref. [3]) the $\mu_{en}$-value is applied, which is mass-energy absorption coefficient. In a preferred embodiment, the thickness of the birefringent material should be not too large nor too small, and is preferably sized to transmit about 20-50% of the photons.

Figure 13:
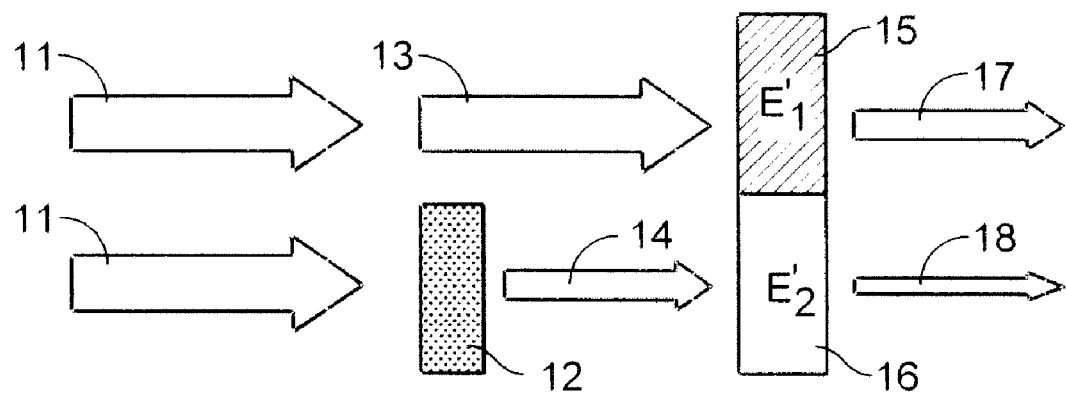
FIG. 13 is a diagram illustrating an example of a quantum-imaging detector for single monochromatic γ-source with two absorption channels.

FIG. 13 is a diagram illustrating a quantum-imaging detector for single monochromatic γ-source with two absorption channels in accordance with one embodiment of the invention. Embodiments can be configured such that the BGO crystal can work both as an attenuator and as a quantum-imaging detector. For example, as illustrated in FIG. 13, two absorption channels are provided with incident fluences: $E_1 N_1/2$, and two BGO crystals, working as an attenuator 12, with thickness, $\Delta x_2$. The illustrated example also includes two quantum-imaging detectors 15 and 16, both with thickness $\Delta x_0$. The illustrated example shows two resulting fluences, $E_1'$ and $E_2'$, in the form of two equations, with the unknown $E_1$ and $N_1$:

$$E_1' = E_1 \frac{N_1}{2}(1 - e^{-\mu_{en}(E_1)\rho \cdot \Delta x_0}) \quad (36a)$$

$$E_2' = E_1 \frac{N_1}{2}(1 - e^{-\mu_{en}(E_1)\rho \Delta x_1}) \quad (36b)$$

Accordingly, two channels generate two non-linear equations. It should be noted that there is typically a difference between the mass linear attenuation coefficient, $\mu$, and the mass linear absorption coefficient, $\mu_{en}$. Particularly, where the mass linear attenuation coefficient, $\mu$, is used for total attenuation (see, for example, Eq. (25)), while the mass linear absorption coefficient, $\mu_{en}$, is used for detection. The mass linear absorption coefficient, $\mu_{en}$, is also denoted by $\mu'$, emphasizing a part absorbed by a detector.

From Eqs. (36), the ratio of the two resulting fluences can be computed as:

$$\frac{E_1'}{E_2'} = e^{\mu(E_1)\rho\Delta x_1}; \mu(E_1) = \frac{1}{\rho\Delta x_1}\ln\frac{E_1'}{E_2'} \quad (37a, b)$$

Because the right side of Eqs. (37a) is known, the left side is also known, and from the NIST tables the value of the fluence $E_1'$ can be determined. Then, Eq. (36a) can be rewritten in the form:

$$N_1 = \frac{E_1'}{E_1}\frac{2}{1 - e^{\mu'(E_1)\rho\Delta x_o}} \quad (38)$$

Because $E_1$ is known, from Eq. (37b), as is $\mu'(E_1)$ (from the NIST tables), the right side of Eq. (38) can be determined, allowing determination of the value of $N_1$. Therefore, from this method, referred to as a variable absorption path method, both incident photon numbers, $N_1$, and photon energies, $E_1$, can be calculated. Particularly with reference to FIG. 13, $N_1$ and $E_1$, coming from incident gamma beams 11, transmitted through two absorption channels 11,13,15,17 and 11,12,14, 16,18, and absorbed by two detectors 15 and 16 (which can be quantum imaging detectors), respectively, can be determined.

The 1$^{st}$ absorption channel in the illustrated example includes detector 15. In this example, for this channel incident beam 11 (with incident photon number, $N_1$, and photon energy, $E_1$) is not attenuated, arriving at beam 13. Unattenuated beam 13 is then at least partially absorbed into the fluence value of $E_1'$, by detector 15. The remainder that is not absorbed by detector 15 is shown as beam 17.

The 2$^{nd}$ absorption channel in the illustrated example includes BGO attenuator 12 and detector 15. Assuming the same incident beam 11, this beam 11 is partially attenuated by BGO attenuator 12, resulting in a weaker beam 14, which is then absorbed into fluence value of $E_2'$, by detector 16. The unabsorbed remainder is illustrated as beam 18.

The example of the Variable Absorption Path (VAP) method, shown in FIG. 13, illustrates the scenario where there are provided two channels for a single monochromatic beam. A more general case can be provided in another embodiment, wherein, for m-number of monochromatic beams, there are 2m channels. These channels are preferably differentiated from each other by different absorption paths in such a way that measured fluences ($E_1',E_2'$, etc) will be different from each other. The different monochromatic beams usually represent various isotope's or several isotopes' gamma radiation quasi-mono-energetic (QME)-lines, as described above with respect to Eqs. (37).

Figure 14:
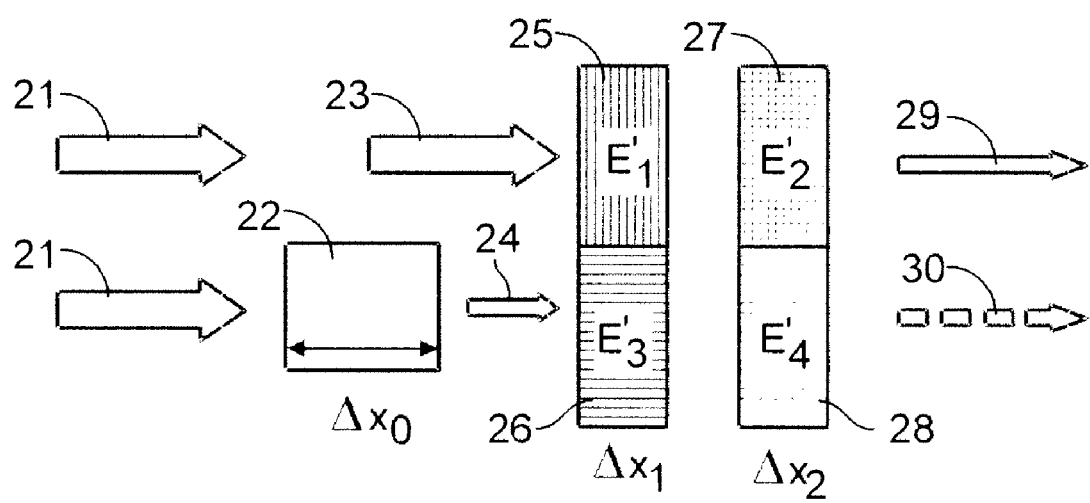
FIG. 14 is a diagram illustrating an example of increasing the number of channels.

FIG. 14 is a diagram illustrating an example of increasing the number of channels. Particularly, the example illustrated in FIG. 14 depicts adding detectors in line to increase the number of channels for a system having a two-energy photon source. Accordingly, FIG. 14 illustrates two monochromatic γ-beams 21, measured by four absorption channels with two absorption paths and four detectors. Referring now to FIG. 14, assume a scenario where there is an x/γ-ray source with two different photon energies $E_1$ and $E_2$, each with a different photon numbers $N_1$ and $N_2$, respectively, illustrating an isotope's two QME-lines. Assume also, an embodiment comprising a two-layer QI-detector having two BGO crystals 25, 26 with thickness $\Delta x_1$ and $\Delta x_2$, and with a BGO crystal passive attenuator 22 with a thickness $\Delta x_0$. Then, the system can be described by four (4) non-linear equations, in the form:

$$E_1' = E_1 N_1(1 - e^{-\mu_1'\rho\Delta x_1}) + E_2 N_2(1 - e^{-\mu_2'\rho\Delta x_1}) \quad (39a)$$

$$E_2' = E_1 N_1(1 - e^{-\mu_1'\rho\Delta x_2}) + E_2 N_2(1 - e^{-\mu_2'\rho\Delta x_2})e^{-\mu_2\rho\Delta x_1} \quad (39b)$$

$$E_3' = E_1 N_1(1 - e^{-\mu_1'\rho\Delta x_1})e^{-\mu_1\rho\Delta x_0} + E_2 N_2(1 - e^{-\mu_2'\rho\Delta x_1})e^{-\mu_2\rho\Delta x_0} \quad (39c)$$

$$E_4' = E_1 N_1(1 - e^{-\mu_1'\rho\Delta x_2})e^{-\mu_1\rho(\Delta x_0+\Delta x_1)} + \quad (39d)$$
$$E_2 N_2(1 - e^{-\mu_2'\rho\Delta x_2})e^{-\mu_2\rho(\Delta x_0+\Delta x_1)}$$

There is no ambiguity in the notation of Eqs. (39), because their left side (e.g.) $E_2'$) identifies the specific detector used for this specific channel. For example, Eq. (39c) describes the optical read-out by the 1$^{st}$ detector, so, the 2$^{nd}$ detector is not used. Therefore, this equation does not contain ($\Delta x_2$)—symbols. $\mu$-symbols with "primes" (such as $\mu_1'$) represent detector absorption, while $\mu$-symbols without "primes" (such as $\mu_1$) represent only attenuation.

The 1$^{st}$ channel in the example illustrated in FIG. 14 can be described as follows. The incident beam 21, with two monoenergetic lines, represented by photon energies $E_1$, $E_2$, and photon numbers $N_1$ and $N_2$, respectively, passes without attenuation (illustrated as beam 23), and then is partially-absorbed by detector 25, with thickness $\Delta x_1$, into fluence $E_1'$.

The 2$^{nd}$ channel in the example illustrated in FIG. 14 can be described as follows. The incident beam 21, passes without attenuation (illustrated as beam 23), and is partially attenuated by BGO crystal 25 with thickness $\Delta x_1$, and partially absorbed (detected) into fluence $E_2'$ by detector 27, with non-absorbed photons 29.

The 3$^{rd}$ channel in the example illustrated in FIG. 14 can be described as follows. The incident beam 21 is attenuated by crystal attenuator 22 with thickness $\Delta x_0$, resulting in attenuated beam 24. Attenuated beam 24 is then partially absorbed (detected) into fluence $E_3'$ by detector 26, with thickness $\Delta x_1$.

The 4$^{th}$ channel in FIG. 14 in the example illustrated in FIG. 14 can be described as follows. The incident beam 21 is attenuated by crystal attenuator 22 with thickness $\Delta x_0$, resulting in attenuated beam 24. Attenuated beam 24 is then attenuated by crystal 26 with thickness $\Delta x_1$, and then partially absorbed (detected) into fluence $E_4'$ by detector 28, with non-absorbed photons 30.

As this example illustrates, BGO crystals can work both as attenuators and detectors in such a way that in one channel they work as detectors while in another one they work as attenuators. For example, crystal 25 works in the 1$^{st}$ channel as a detector, while in the 2$^{nd}$ channel crystal 25 also works as an attenuator.

The γ-counter in FIG. 14 is a system of four non-linear equations (Eqs. (39)) with four unknowns: $E_1$, $N_1$, $E_2$, $N_2$. They can be solved numerically, in a similar way as Eqs. (36), by applying the NIST tables.

Further generalizations of the architectures as in FIGS. 13 and 14 can lead into increasing a number of detectors or attenuators, scenarios of which are described below with reference to FIGS. 15 and 16.

Figure 15:
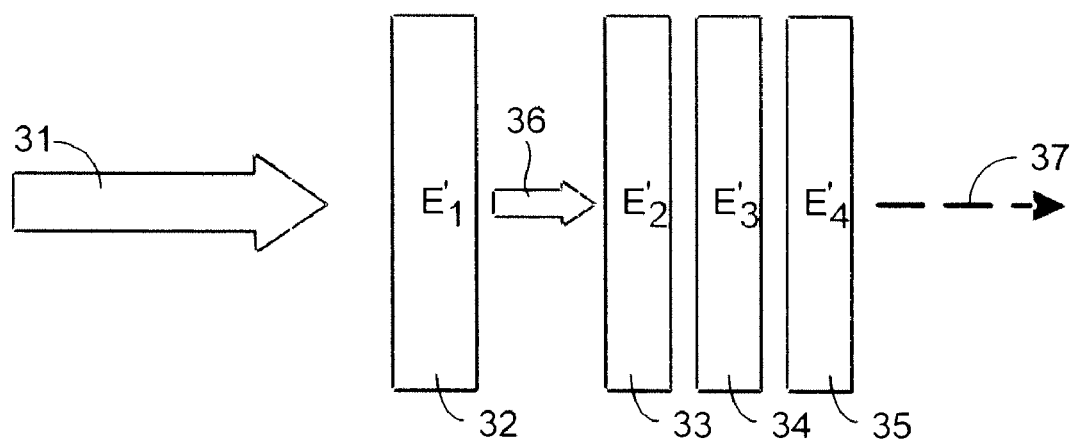
FIG. 15 is a diagram illustrating an example embodiment having four absorption channels in sequence.
Figure 16:
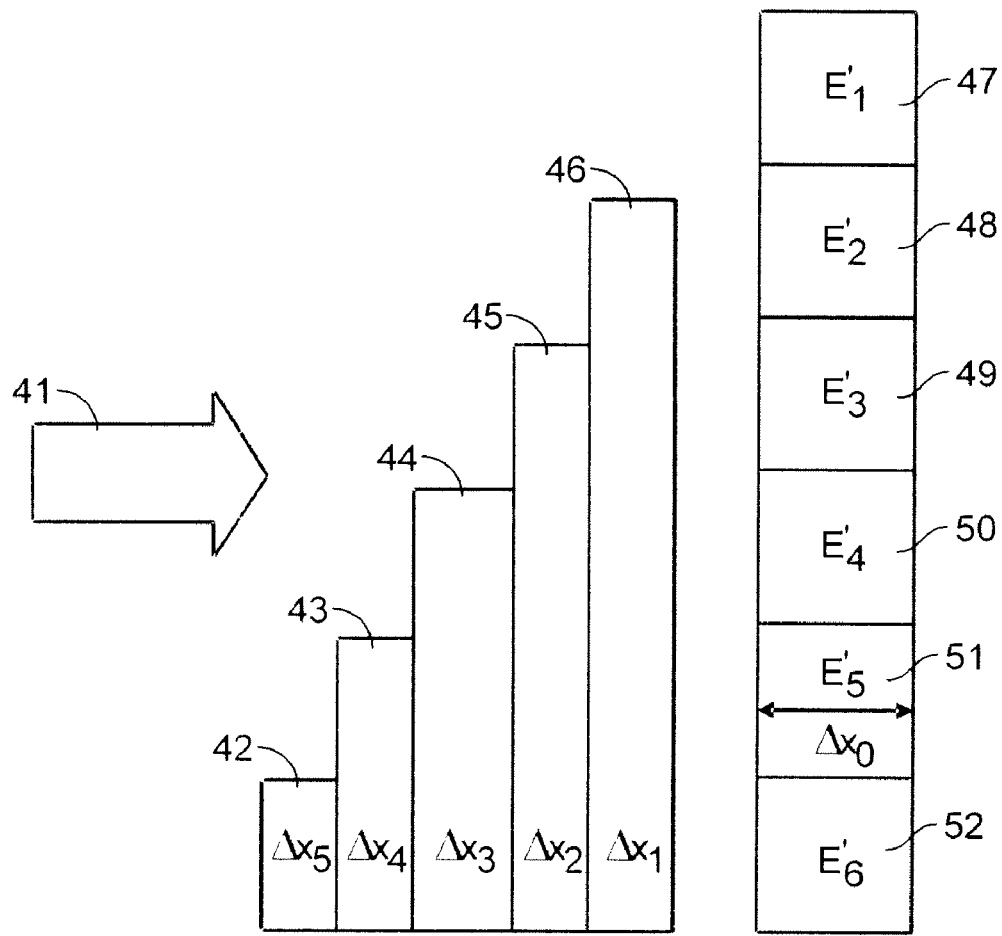
FIG. 16 is a diagram illustrating an example embodiment wherein a parallel solution of multiple absorption paths is presented.

FIG. 15 is a diagram illustrating an example embodiment having four absorption channels in sequence. Referring now to FIG. 15, assume for example a gamma-ray source with two different photon energies $E_1$ and $E_2$, and with different incident photon numbers $N_1$ and $N_2$, respectively. Assume also an embodiment having a four-layer QI-detector, each with different thicknesses $\Delta x_1$, $\Delta x_2$, $\Delta x_3$, and $\Delta x_4$ as the mask illustrated in FIG. 15. In the illustrated example, these detectors 32, 33, 34, 35 can be used to create four channels. For example, in the 2$^{nd}$ channel, crystal 32 functions as an attenuator, while crystal 33, functions as a detector.

The operation of the system depicted in FIG. 15 is somewhat similar to the example depicted in FIG. 14. For example, consider the 4$^{th}$ channel in FIG. 15. In this channel, incident beam 31 is attenuated by crystal 32 into a weaker beam 36, then attenuated by a crystal 33, then attenuated by crystal 34, then partially absorbed (detected) by detector 35, with non absorbed parts of photons remaining in attenuated beam 37. The system of four non-linear equations to describe this example is:

$$E_1' = E_1 N_1 \left(1 - e^{-\mu_1' \rho \Delta x_1}\right) + E_2 N_2 \left(1 - e^{-\mu_2' \rho \Delta x_1}\right) \tag{40a}$$

$$E_2' = E_1 N_1 \left(1 - e^{-\mu_1' \rho \Delta x_2}\right) e^{-\mu_1 \rho \Delta x_1} + E_2 N_2 \left(1 - e^{-\mu_2' \rho \Delta x_2}\right) e^{-\mu_2 \rho \Delta x_1} \tag{40b}$$

$$E_3' = E_1 N_1 \left(1 - e^{-\mu_1' \rho \Delta x_3}\right) e^{-\mu_1 \rho (\Delta x_1 + \Delta x_2)} + \tag{40c}$$
$$E_2 N_2 \left(1 - e^{-\mu_2' \rho \Delta x_3}\right) e^{-\mu_2 (\Delta x_1 + \Delta x_2)}$$

$$E_4' = E_1 N_1 \left(1 - e^{-\mu_1' \rho \Delta x_4}\right) e^{-\mu_1 \rho (\Delta x_1 + \Delta x_2 + \Delta x_3)} + \tag{40d}$$
$$E_2 N_2 \left(1 - e^{-\mu_2' \rho \Delta x_4}\right) e^{-\mu_2 \rho (\Delta x_1 + \Delta x_2 + \Delta x_3)}$$

It should be emphasized that, as in FIG. 15, four BGO crystals 32, 33, 34, 35, can work both as active components (i.e., as a detectors), and as passive elements (i.e., as attenuators). Active elements would include elements such as appropriate electrodes and applied voltage to allow active detection operations. However, when an otherwise applied voltage is turned off or removed, these crystals become passive. Accordingly, provided the extra electrode hardware does not interfere with optical properties, components configured as active components can take on a dual role. The systems and methods described herein can be implemented to preserve such an optional solution, as will be described further herein.

In example illustrated in FIG. 15, an all-sequential solution is presented, wherein an incident beam is partially attenuated by four crystals, in sequence. FIG. 16 is a diagram illustrating an example embodiment wherein a parallel solution is presented. Referring now to FIG. 16, in this example, assume there are n-number of incident beams passing through various absorption paths, realized by a plurality of attenuators. Particularly, for purposes of description, assume an incident γ-beam array of six beams 41, combining three isotope lines, with photon energies: $E_1$, $E_2$, $E_3$, and incident photon numbers: $N_1$, $N_2$, $N_3$, respectively. The illustrated example shows, the incident γ-beam array of six beams 41 is incident upon six (6) different absorption paths, implemented using five attenuators 42, 43, 44, 45, 46, with the 1$^{st}$ channel un-attenuated. As shown in this example, incident γ-beam array of six beams 41 is absorbed or detected in parallel by six crystals (detectors) 47, 48, 49, 50, 51, 52. This example embodiment can be described by a system of six non-linear equations:

$$E_1' = E_1 N_1 (1 - \exp\{-\mu_1' \rho \Delta x_0\}) + \tag{41a}$$
$$E_2 N_2 (1 - \exp\{-\mu_2' \rho \Delta x_0\}) + E_3 N_3 (1 - \exp\{-\mu_3' \rho \Delta x_0\})$$

$$E_2' = E_1 N_1 (1 - \exp\{-\mu_1' \rho \Delta x_0\}) \exp\{-\mu_1 \rho \Delta x_1\} + \tag{41b}$$
$$E_2 N_2 (1 - \exp\{-\mu_2' \rho \Delta x_0\}) \exp\{-\mu_2 \rho \Delta x_1\} +$$
$$E_3 N_3 (1 - \exp\{-\mu_3' \rho \Delta x_0\}) \exp\{-\mu_3 \rho \Delta x_1\}$$

$$E_3' = E_1 N_1 (1 - \exp\{-\mu_1' \rho \Delta x_0\}) \exp\{-\mu_1 \rho (\Delta x_1 + \Delta x_2)\} + \tag{41c}$$
$$E_2 N_2 (1 - \exp\{-\mu_2' \rho \Delta x_0\}) \exp\{-\mu_2 \rho (\Delta x_1 + \Delta x_2)\} +$$
$$E_3 N_3 (1 - \exp\{-\mu_3' \rho \Delta x_0\}) \exp\{-\mu_3 \rho (\Delta x_1 + \Delta x_2)\},$$

$$E_4' = E_1 N_1 (1 - \exp\{-\mu_1' \rho \Delta x_0\}) \exp\{-\mu_1 \rho (\Delta x_1 + \Delta x_2 + \Delta x_3)\} + \tag{41d}$$
$$E_2 N_2 (1 - \exp\{-\mu_2' \rho \Delta x_0\}) \exp\{-\mu_2 \rho (\Delta x_1 + \Delta x_2 + \Delta x_3)\} +$$
$$E_3 N_3 (1 - \exp\{-\mu_3' \rho \Delta x_0\}) \exp\{-\mu_3 \rho (\Delta x_1 + \Delta x_2 + \Delta x_3)\},$$

$$E_5' = E_1 N_1 (1 - \exp\{-\mu_1' \rho \Delta x_0\}) \exp\{-\mu_1 \rho (\Delta x_1 + \Delta x_2 + \Delta x_3 + \Delta x_4)\} + \tag{41e}$$
$$E_2 N_2 (1 - \exp\{-\mu_2' \rho \Delta x_0\}) \exp\{-\mu_2 \rho (\Delta x_1 + \Delta x_2 + \Delta x_3 + \Delta x_4)\} +$$
$$E_3 N_3 (1 - \exp\{-\mu_3' \rho \Delta x_0\}) \exp\{-\mu_3 \rho (\Delta x_1 + \Delta x_2 + \Delta x_3 + \Delta x_4)\},$$

$$E_6' = E_1 N_1 (1 - \exp\{-\mu_1' \rho \Delta x_0\}) \tag{41f}$$
$$\exp\{-\mu_1 \rho (\Delta x_1 + \Delta x_2 + \Delta x_3 + \Delta x_4 + \Delta x_5)\} +$$
$$E_2 N_2 (1 - \exp\{-\mu_2' \rho \Delta x_0\}) \exp$$
$$\{-\mu_2 \rho (\Delta x_1 + \Delta x_2 + \Delta x_3 + \Delta x_4 + \Delta x_5)\} +$$
$$E_3 N_3 (1 - \exp\{-\mu_3' \rho \Delta x_0\}) \exp$$
$$\{-\mu_3 \rho (\Delta x_1 + \Delta x_2 + \Delta x_3 + \Delta x_4 + \Delta x_5)\},$$

As these examples serve to illustrate, various Variable Absorption Path (VAP) embodiments can be implemented to realize γ-counting operation for optical-readout-based quantum-imaging detection. They can also be implemented to work for both strong and weak γ-beams. The algorithmic system is solving 2m-equations for m-isotope lines. Because, in general, in some applications, the number of isotope lines might not be known, in one embodiment the process can be implemented to assume the most conservative practical case, which might be based, for example, on the specific concept of operations or CONOPS. Assume, for example, that based on CONOPS, it is determined that the maximum number of isotope lines is six. Accordingly, in one embodiment it is assumed that the number of variable attenuation path channels would be twelve, based on the fully-parallel architectures (example illustrated in FIG. 16), fully-sequential architectures (example illustrated in FIG. 15), or hybrid architectures (example illustrated in FIG. 14) architecture.

In one embodiment of the invention, a quantum imaging and detection system can be implemented to provide both gamma counting and gamma spectroscopy. For example, this can be accomplished, by applying Variable Absorption Path (VAP) methods as described above into secondary electron cloud (secondary electron cloud) visualization.

Figure 17:
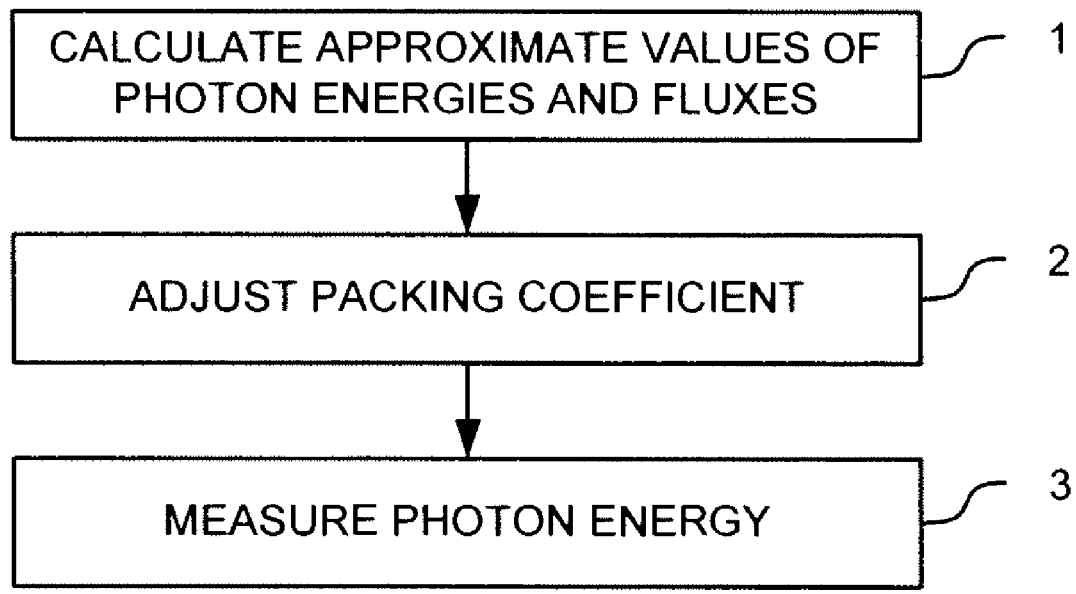
FIG. 17 is an operational flow diagram illustrating an example process for quantum imaging and detection.

FIG. 17 is an operational flow diagram illustrating an example process for quantum imaging and detection in accordance with one embodiment of the invention. Referring now to FIG. 17, in the first operation, gamma photon counting is performed, and approximate values of photon energies and fluxes are calculated. For example, a variable attenuation path process can be applied (for example, as defined by Eqs. (34-41)), to calculate approximate values of photon energies: $E_1, E_2, E_3, \ldots$ of isotope spectral lines for a measured gamma source, as well as values of photon numbers: $N_1, N_2, N_3, \ldots$, and equivalent fluences: $F_1, F_2, F_3, \ldots$ (where: $F_1 = N_1 E_1, F_2 = N_2 E_2, F_3 = N_3 F_3, \ldots$). As noted, this can be done for both strong and weak gamma beams.

With continued reference to FIG. 17, in the second operation, selective attenuation is applied to adjust the packing coefficients. For example, in one embodiment a fully parallel variable attenuation path architecture can be applied (for example, as shown in FIG. 16), to reduce the spectral lines' fluences, to such values ($F_1', F_2', F_3', \ldots$,) such that their respective packing coefficients: $p_1, p_2, p_3, \ldots$, will be smaller to improve analysis. For example, in one embodiment the fluences are reduced such that the packing coefficients of the secondary electron clouds are significantly smaller than unity. For example, in one embodiment this can be done to avoid or minimize the amount of secondary electron cloud (secondary electron cloud) overlapping. This can allow detection or identification of individual secondary electron clouds, each associated with a single photon.

In another embodiment, where overlapping occurs, algorithms can be applied to process the image data to determine the actual number of secondary electron clouds despite overlap of the clouds. Accordingly, an overlap analysis can be applied for a case when two secondary electron clouds overlap. Such an overlap analysis can be based on the fact that the profile of the single secondary electron cloud is all-convex one; i.e., the $1^{st}$ partial differentials of the cloud boundary vary monotonically, without approaching maxima, or minima. Therefore, in the case of the single cloud, there are no local minima.

In other words, in the case of single cloud, there is no such location at this cloud area that a local minimum or second local maximum will exist. In contrast, in the case of two (or more) overlapping clouds, there are such locations that local maxima/minima exist. Therefore, the overlap analysis algorithms are configured to monitor and check for the existence of such local maxima/minima. In a practical realization, the image is first processed to improve the signal-to-noise ratio of the image and to delete background information, then edge detection can be performed. In one embodiment, Canny edge-detection methods are used to smooth the image with a Gaussian filter to reduce the noise. Edge detection can be performed using, for example, gradient edge detection. Examples of such detection include Sobel edge detection and Prewitt gradient edge detection or other methods. Then, using thresholding, contours of the overlapping clouds can be obtained. For example, Marr-Hildreth edge detection methods can be applied. Marr-Hildreth edge detection finds edges by second order differentiation, which is an equivalence of local maxima/minima detection. In other words, it can be assumed, in one embodiment, that non-regular contour shapes are a consequence of multiple cloud overlap, and the $2^{nd}$ partial differential, or local maxima/minima detection can be used. Accordingly, the overlap analysis algorithm separates one cloud from the other and then, both clouds are computed independently.

Then, in the third operation shown in the example of FIG. 17, photon energy is measured with high energy resolution. In one embodiment, secondary electron cloud visualization can be performed using an optical imaging or readout technique. For example, in one embodiment, a readout beam is passed through the crystal, and thereby through the secondary electrons forming the cloud. The polarization of the beam is altered by the secondary electron cloud, and the detected beam can then be analyzed. Measurement can be made by quantum-imaging, in order to obtain previous values of $E_o$-single photon energy. For example, the following operation can be computed.

$$E_1 \to E_{10}; \left| \frac{\Delta E_{10}}{E_{10}} \right| \ll 1 \tag{42}$$

Having thus described an example operation, attention is now focused on the second operation of transferring from gamma counting to gamma spectroscopy. Following Eq. (31), the probability of absorption (detection), for the example BGO crystal, with thickness, x, is given by Eq. (43) where $\beta'$ is the linear absorption coefficient in cm$^{-1}$:

$$q(x) = 1 - e^{-\beta' x} \tag{43}$$

Accordingly, the probability density, $\rho(x)$, can be determined as taught by Ref [20] as:

$$\rho(x) = \frac{dq}{dx} = \beta' e^{-\beta' x}; \int_o^\infty \rho(x) dx = 1; \rho(0) = \beta' \tag{44a, b, c}$$

Figure 18:
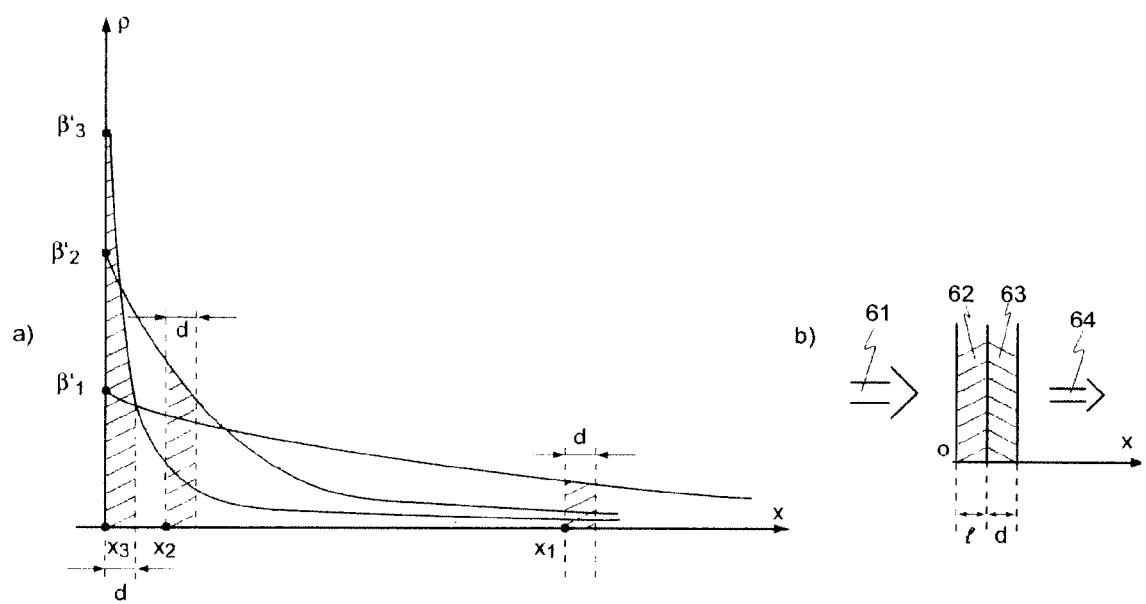
FIG. 18 is a diagram illustrating an example implementation of operation 2 of FIG. 17, where the fluences are reduced to adjust the packing coefficient.

FIG. 18 is a diagram illustrating an example implementation of operation 2 of FIG. 17, where the fluences are reduced to adjust the packing coefficient. FIG. 18 shows (a) $\rho(x)$-dependence for three isotope lines; and (b) attenuator/detector geometry.

Referring now to FIG. 18, $\rho(x)$-dependence has been illustrated for three different photon energies: $E_1 > E_2 > E_3$. Accordingly, in this scenario, $\beta_1' < \beta_2' < \beta_3'$, and the curves cross each other. The hatched areas illustrate absorption probabilities for detectors with thickness, d, buffered by attenuators with thickness, l, as in FIG. 18(b), where $l = x_1$, $l = x_2$, $l = x_3$, as in FIG. 18(a). Accordingly, $x_3 = 0$.

Therefore, the probability that a photon will be absorbed at detector range: from $x_o$, to $x_o + d$, is given by Eq. (45), where $x_o = x_1, x_2, x_3$, etc.

$$q_o(x_o, x_o + d) \equiv \int_{x_o}^{x_o + d} \rho(x) dx \tag{45}$$

From FIG. 18, it can be seen that for the lowest photon energy, $E_3$, the optimum value of $x_3$, is: $x_3 = 0$; then, $q_3 (x_3, x_3 + d)$ reaches a maximum value, about 50%. A gamma counter architecture realizing the scenario illustrated in FIG. 18(a), and illustrated in FIG. 18(b), is shown in FIG. 16, for only three channels, where the $1^{st}$ channel is for $E_1'$, or 47; the $2^{nd}$ channel is for $E_2'$, or 48, and $x_o = x_2$, and the $3^{rd}$ channel is for $E_3'$ or 49, and $x_o = x_1$.

In FIG. 18(b), the incident beam 61 with three spectral lines, with photon energies $E_1, E_2, E_3$, and linear absorption coefficients $\beta_1', \beta_2', \beta_3'$, is passing through attenuator 62 with thickness l, which in one embodiment is different for each energy maximum capture value, as in FIG. 18(a), namely:

$l=x_3=0$, for $E_3$; $l=x_2$, for $E_2$, and $l=x_1$, for $E_1$. Then, it is absorbed (detected) by detector 63, with thickness, d, and with remaining beam 64.

In such a case, for each parallel channel, embodiments can be implemented to maximize (or, improve) absorption for a specific photon energy, with a reduced or minimized packing coefficient. Accordingly, implementations providing optimum conditions for optical readout and subsequent data processing can be provided. Therefore, providing a gamma-counting buffer can be used to realize selective attenuation in such a way that given isotope spectral lines, or quasi-mono-energetic (QME)-lines, are maximally isolated in a sense of the secondary electron cloud visualization. In other words, in the case of optimum realization, the secondary electron cloud pictures, such as those simulated in FIGS. 7-11, will be clear for a specific spectral line. In other words, conditions can be achieved such that the secondary electron clouds of a specific photon energy, $E_o$, dominate a picture, over other secondary electron clouds, and the dominant clouds do not overlap each other. Accordingly, in some embodiments they can be measured with high precision.

In various embodiments of the invention, an optical readout of the detector can be provided, which can allow, for example, visualization of the secondary electron clouds for single photons. The image can be captured using various techniques, and the captured data analyzed using image processing techniques (such as, for example, digital signal processing) to perform or facilitate the spectral analysis. Accordingly, the quantum imaging write-in process can be in the form of an optical read out for secondary electron cloud visualization.

Figure 19:
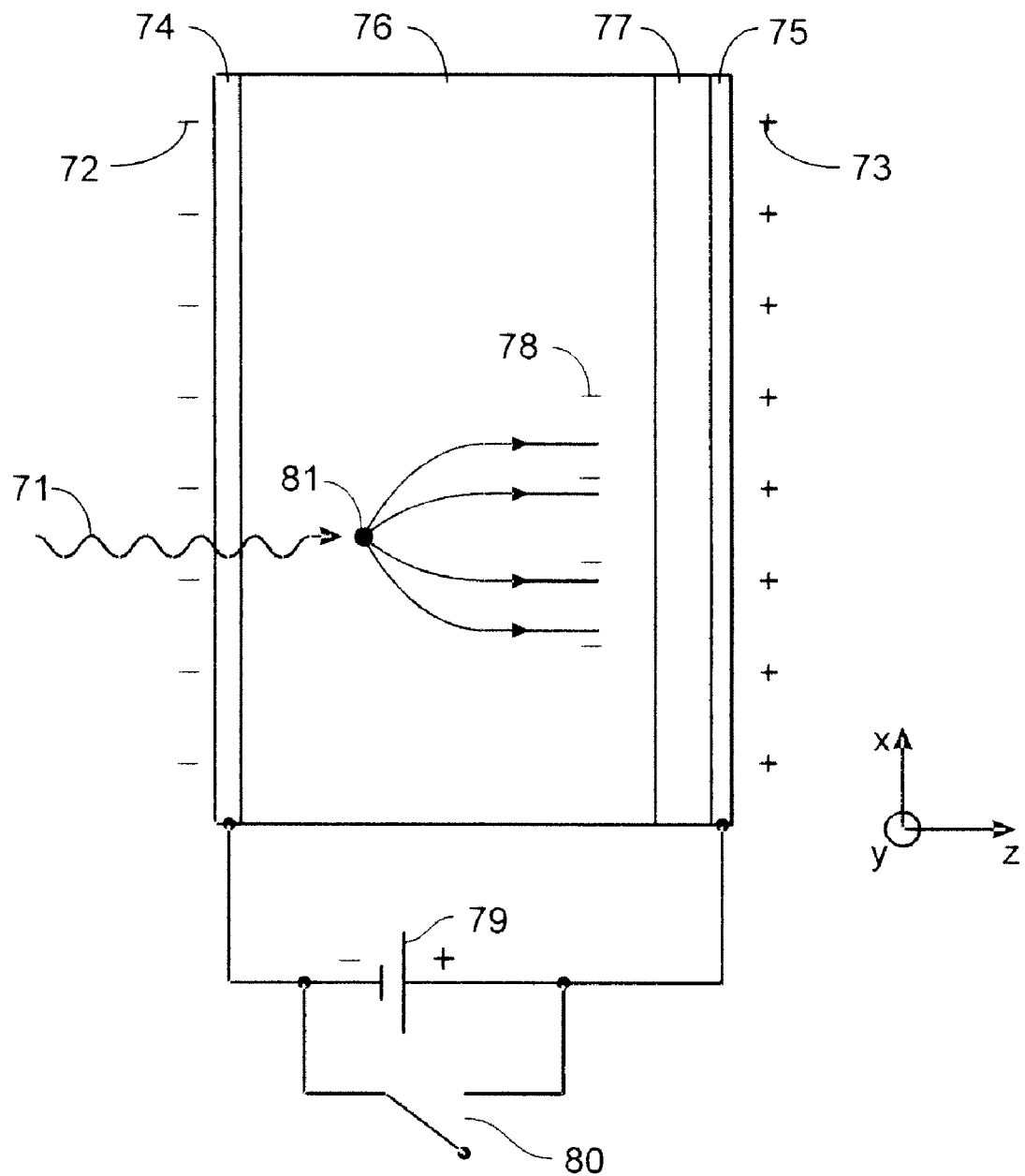
FIG. 19 is a diagram illustrating an example of secondary electron cloud write-in for quantum imaging.

FIG. 19 is a diagram illustrating an example of secondary electron cloud write-in for quantum imaging in accordance with one embodiment of the invention. Particularly, the illustrated example shows an incident photon 71 creating a secondary electron cloud 81 that can be optically read out at the other end of the crystal. In the process illustrated in FIG. 19, high-energy photon 71 is incident on the crystal 76, and photo-absorbed in this crystal at 81, thus creating the secondary electron cloud of electrons 81, which collapse under the influence of the applied electric field 79 into surface electrons 78. In one embodiment, the crystal 76 is a BGO or BSO crystal, but could be another birefringent material.

In the example illustrated in FIG. 19, the crystal 76 is disposed between two electrodes 74 and 75. In one embodiment, these electrodes can be optically transparent to allow the optical beam to pass through one or both ends of the device to "read" the electron cloud. For example, in some embodiments, the electrodes can be made using Indium Tin Oxide (ITO) crystal structure. In one embodiment, the crystal is cut with an orientation such as (100). Accordingly, with the presence of electrodes 74 and 75, crystal 76 is configured as an active crystal. In one embodiment, one electrode (for example, electrode 74) can also be provided with a reflective surface such that the readout beam can enter the crystal passing through electrode 75, reflect off of electrode 74, and pass back out of the crystal through electrode 75. Preferably, in one embodiment, the BGO (or, other) crystal 76 is of sufficiently high quality such that the number of volume traps is small and the traps are shallow.

Also shown in the illustrated example is a dielectric layer 77. Dielectric layer 77 can be configured to acts like a capacitor to store the electrons for the readout process. Particularly, CW battery 79 can be provided with a switch 80 to provide power. In one embodiment, CW battery 79 provides about 600 volts. Due to electric CW-voltage created by CW-battery 79 with switch 80, the secondary electrons move into the crystal 76 (to the right in the illustrated example), and are trapped at the dielectric capacitor 77 surface, as 78. This creates a surface density, σ, such that the total secondary electron cloud charge as in Eq. (26) is shown by:

$$Q = \iint dx dy \sigma(x,y) \qquad (46)$$

On the other hand, the initial creation of charge carriers (before thermalization) results in energy being distributed in (x,y) with energy density $\sigma_E(x,y)$. Like the cloud charge shown in Eq. (46), the energy density, $\sigma_E(x,y)$, can be shown as:

$$E_o = \iint dx dy \sigma_E(x,y) \qquad (47)$$

This can be identified as representing the X-ray fluence (in $J/cm^2$).

Accordingly, there can be assumed some equivalency between photon energy and the charge in the electron cloud. In other words, when a photon is decomposed into electrons in the crystal, the energy level should be the same, at least approximately. But after the electrons are decomposed, thermalization reduces the secondary electron energy from $E_j$ to $E_g$ (like $E_o \to E_o'$). Accordingly, After thermalization, the energy $E_o$ results in $E_o'$, as in Eq. (26).

In the illustrated example, the quantum-imaging device is implemented as a cumulative device, with read-out starting after switch 80 is closed. Therefore, there is no displacement current, as was the case taught in Ref [21], and no Ramo factor, as in the case of an electronic read-out.

The energy, $E_o'$, is distributed with lowered energy density $\sigma_E'(x,y)$ such that $$E_o' = \iint dx dy \sigma_E'(xy) \qquad (48)$$

Thermalization creates a statistical distribution, wherein each photon is slightly different—a Poisson Noise effect. Because Eq. (26) represents a statistical average, for a given statistical realization:

$$\frac{E_o}{E_j} = \frac{\tilde{E}_o'}{E_g} = \tilde{N} \qquad (49)$$

Where $\tilde{E}_o'$ and $\tilde{N}$ are statistical quantities, fluctuating due to Poisson noise, and other statistical factors described herein. Because of fluctuations, it may not always be possible to determine photon energy with complete accuracy. The number density of electrons, n(x,y) is $$N = \frac{E_o'}{Eg} = \iint dx dy \, n(x, y) \qquad (50)$$

And the equivalence between this number density and fluence $\sigma_E'(x,y)$, is $$n(x, y) = \frac{\sigma_E'(x, y)}{E_g} \qquad (51)$$

Figure 20:
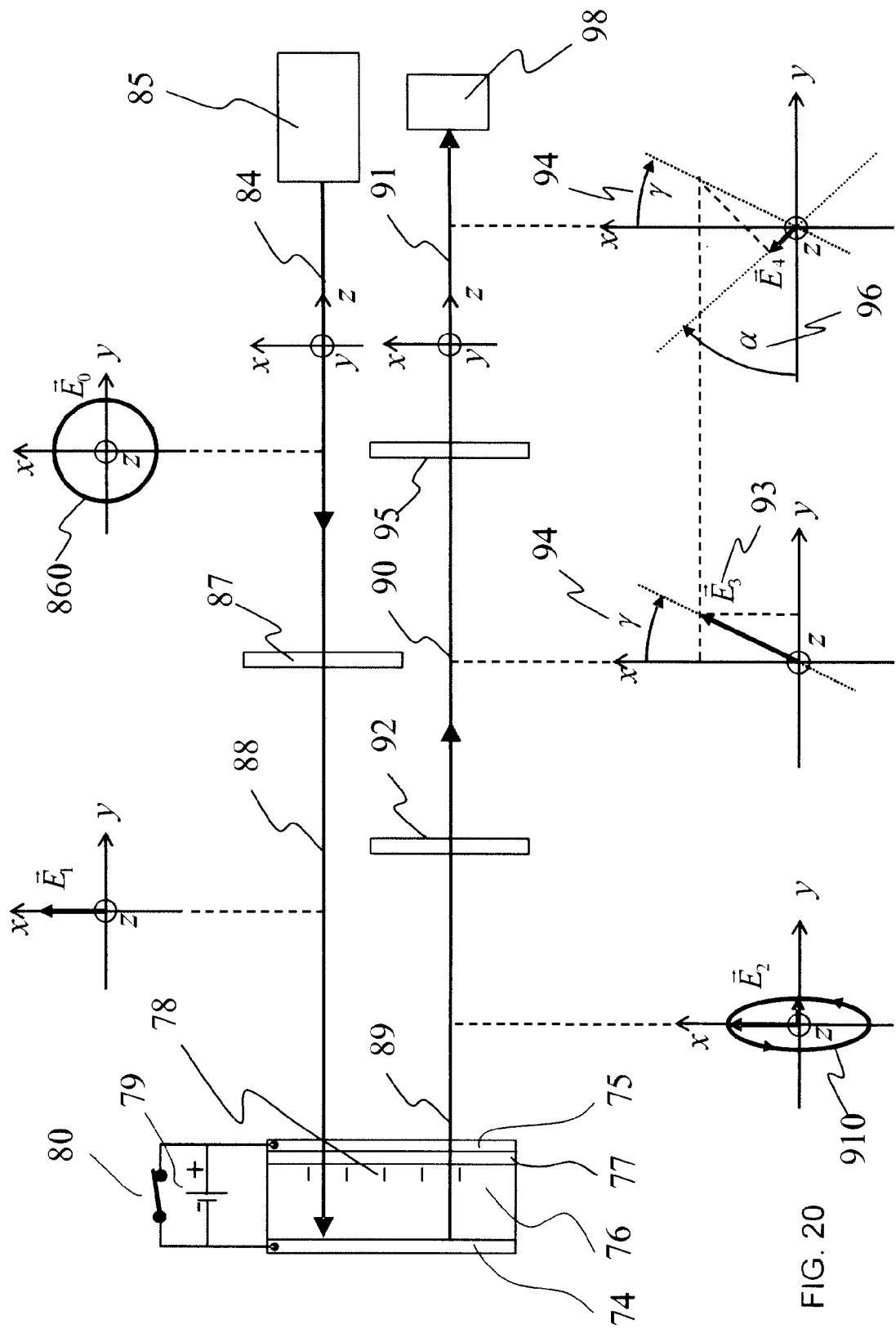
FIG. 20 is a diagram illustrating an example system for optically reading the charges resulting from secondary electron clouds.

After the quantum imaging write in process has occurred, the captured surface charges 78 resulting from one or more secondary electron clouds 81 can be read optically. FIG. 20 is a diagram illustrating an example system for optically reading the surface charges 78 resulting from one or more secondary electron clouds 81.

With reference to FIGS. 19 and 20, the readout process is initiated by closing switch 80. Then, charges 72 and 73 (illustrated in FIG. 19) are zeroed, but charges 78 remain at the dielectric-crystal 77 interface. As illustrated in FIG. 20, the optical read-out process uses a source of optical radiation 85 generating an optical beam 84, having an optical radiation electric field $\vec{E}_0$, which in FIG. 20 is represented as a circle 860 to indicate random polarization state. Preferably, optical beam 84 is in the visible or near infrared portion of the electromagnetic spectrum. This optical radiation, having an intensity, $I_0$, (in W/cm$^2$) is passed through a polarizer 87. In one embodiment, polarizer 87 is oriented along a predetermined direction (in the illustrated example, the x direction) such that the transmitted optical radiation 88 has its electrical field $\vec{E}_1$ oriented in a specific direction, which in the illustrated example is the x direction.

Optical radiation 88, as illustrated, continues to the detection device. Upon passage through the BGO, BSO or other crystal 76 and reflection from the surface 74, the optical radiation 88 is modified to optical radiation 89 due to presence of charges 78. Particularly, as described in more detail below, the polarization of the optical radiation is altered by the surface charges 78 resulting from one or more secondary electron clouds 81. Optical beam 89 is modified with respect to optical beam 88 in that the electric field $\vec{E}_2$ of optical radiation 89 is elliptically polarized. This is represented by the ellipse 910 in the example of FIG. 20.

In the illustrated example, optical radiation 89 passes through a quarter wave plate 92 such that the elliptically polarized electric field 91 of optical radiation 89 is transformed to a linearly polarized electric field $\vec{E}_3$ that is oriented at an angle γ 94 relative to the x axis. This modified radiation is referred to as optical radiation 90.

In the illustrated example, the optical radiation 90 then passes through a second polarizer (also called an analyzer) 95. The analyzer 95 has its axis oriented at an angle α 96 relative to the y direction, which is the direction orthogonal to the axis of polarizer 87. The optical radiation 91 emerging from the polarizer 95 has an electric field $\vec{E}_4$ oriented at an angle α 96 relative to the y direction. The radiation characterized by electric field 97 is detected by the detector 98.

In a preferred embodiment, the optical detector 98 includes an x, y position sensing optical detector or an imaging sensor and records the optical radiation as a spatial intensity profile I(x,y). Accordingly, the beam is detected and the change in beam properties as affected by the electrons 78 can be determined. In one embodiment, detector 98 is a CCD or CMOS image sensor, although other detectors 98 can be used. Detector 98 can be embodied as an image sensor coupled to a data processing system to allow processing of the image data or an image sensor for a camera to allow visualization of the electron patterns by a human. Recording mechanisms can be used to capture the image data for later playback (visually) or analysis. Images can be displayed for electronic or human analysis. See, for example, FIGS. 7-11.

The example illustrated in FIG. 20, the polarizers 87 and 95 are not configured with their polarization axes perpendicular to one another. Having perpendicular axes would typically achieve minimum initial transmission (i.e., a conventional, "dark field" readout geometry). Thus if an arrangement of perpendicular polarizers 87 and 95 were to be employed for the purpose of visualization of secondary electrons 78, the transmission change produced presence of secondary electrons 78 will end up being proportional to the square of the induced phase delay Γ(x,y) between the two orthogonal polarizations of optical radiation as it enters into and emerges out of crystal 76.

Figure 21:
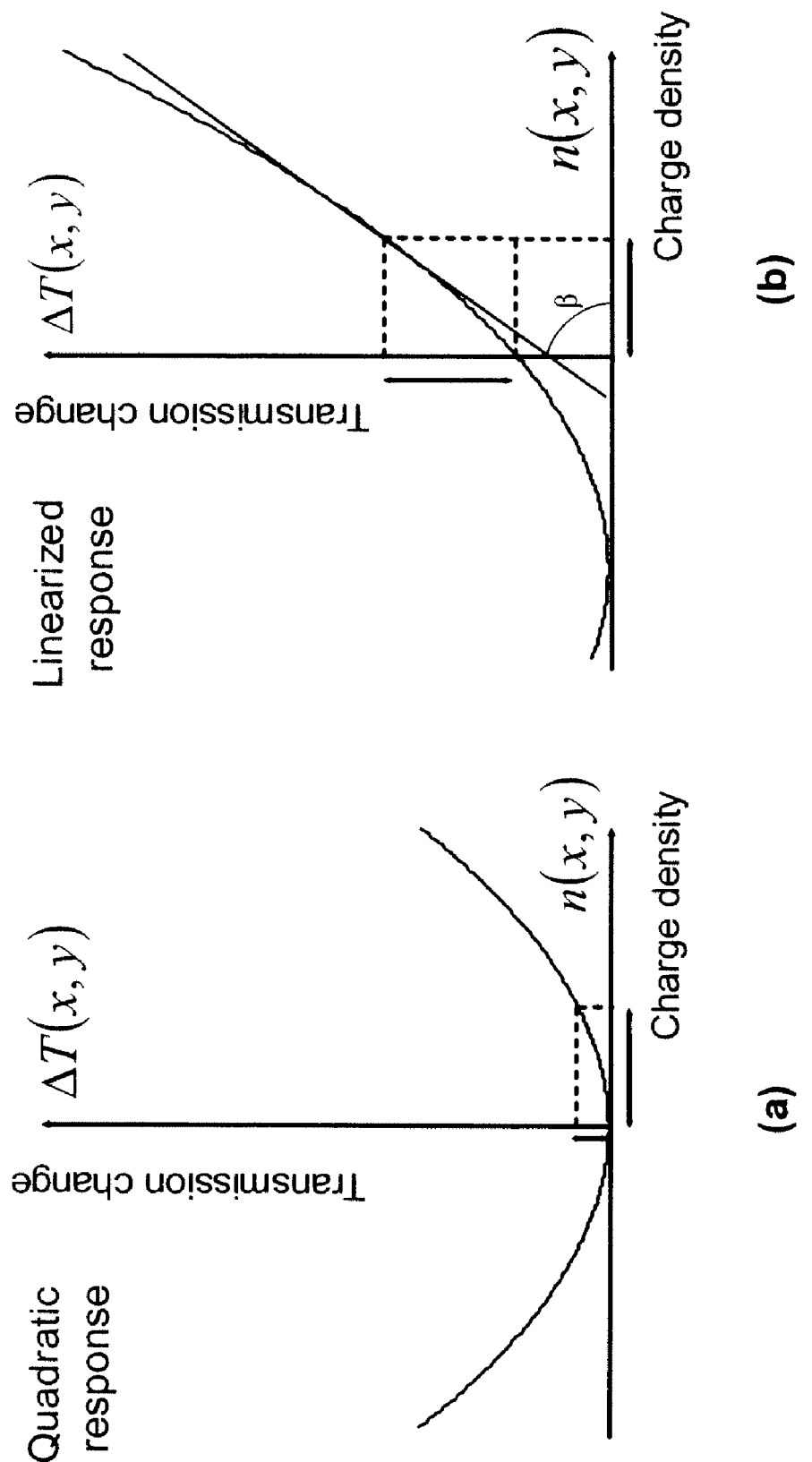
FIG. 21 is a diagram illustrating the linearization of detector response in the quantum imaging optical read-out process.

FIG. 21 is a diagram illustrating the linearization of detector response in the quantum imaging optical read-out process. FIG. 21(a) shows a quadratic response from orthogonal polarizer configurations, while FIG. 21(b) shows a linear response of the transmission change ΔT(x,y) to electron density n(x,y) of the secondary electrons due to preferred configuration of polarizers and the quarter wave plate.

Assume for instance such an arrangement with polarizers 87 and 95, and no quarter wave plate 92, if $I_0$ is the uniform intensity of the optical radiation before it enters the arrangement, the intensity of optical radiation $I_{out}(x,y)$ emerging out of such an arrangement would be given by:

$$I_{out}(x, y) = I_0 \sin^2\left[\frac{\Gamma(x, y)}{2}\right] \approx I_0 \frac{\Gamma^2(x, y)}{4} = I_0 \frac{[Cn(x, y)]^2}{4} \quad (52)$$

Because Γ=0 initially, in the absence of the secondary electrons 78, $I_{out}(x,y)|_{initial}=0$. The change in transmission ΔT(x,y), that occurs in the presence of secondary electrons 78 is proportional to the square of the phase change Γ(x,y). The phase change Γ(x,y) is proportional with the electron density n(x,y). This yields the following expression for the transmission change ΔT(x,y):

$$\Delta T(x, y) = \qquad (53)$$
$$\frac{I(x, y) - I_{out}(x, y)|_{initial}}{I_0} = \frac{I_{out}(x, y)}{I_0} = \frac{\Gamma(x, y)^2}{4} = \frac{C^2}{4}n^2(x, y)$$

However, such an arrangement employed leading to a square dependence of the signal on the charge density n(x,y) (as in FIG. 21(a)), could be problematic for use in systems such as those shown in FIG. 20 for two reasons: 1) the signal for secondary electron cloud 81 of large size produced by high-energy photons practically disappears; and 2) the non-linearity complicates the charge integration, especially in circumstances were the secondary electron cloud 81 is of small size—for example, covering only a few pixels of x, y position sensing optical detector 98. Additionally, the inclination angle is zero, for n=0 at FIG. 21(a), which means that sensitivity at low signal levels is very low.

Embodiments such as that illustrated in FIG. 20 can be implemented to avoid these shortcomings by effectively linearizing the detection technique. For example, polarizer and quarter-wave-plate configurations can be provided wherein, the transmission change ΔT(x,y) is linearly proportional to, or approximately linearly proportional to, phase change Γ(x,y), and hence linearly proportional to electron density n(x,y). As can be seen in FIG. 21(b), the inclination angle, β, has a higher value at n=0 and accordingly, sensitivity is higher than conventionally taught solutions.

In one embodiment, to achieve the linearization as described above, the present invention employs the quarter wave plate 92 to alter the optical radiation 89 emerging from crystal 76 so that the electric field 91 (referred to as $\vec{E}_2$) of the optical radiation 90 is elliptically polarized. Additionally, polarizers 87 and 95 can be employed in a manner completely different from perpendicular axes. For example, as illustrated in FIG. 20, the second polarizer (analyzer) 95 can be detuned from the first polarizer 87 by an angle 96

(referred to as a) from the orthogonal orientation. Thus, in such embodiments, the transmission change, ΔT(x,y), can be given by:

$$\Delta T(x, y) = \sin^2\left[\alpha + \frac{\Gamma(x, y)}{2}\right] - \sin^2\alpha \approx \frac{\sin 2\alpha}{2}\Gamma(x, y) \approx C\frac{\sin 2\alpha}{2}n(x, y) \quad (54)$$

Thus, the operating point can be moved from the coordinate system origin (as in FIG. 21(a)), to a higher position (as in FIG. 21(b)). This is because moving the operating point is equivalent to introducing the second term (sin²α) in the above equation (54), thus causing the linearization effect, or the proportionality of ΔT(x,y) quantity to (sin²α), and, in turn, to n(x,y), instead of n²(x,y) as in conventional solutions as shown in Eq. (53).

In another embodiment, the linearization method can be implemented by applying a small reverse voltage that is the reverse of 79 (instead of the zero voltage 80 employed in above embodiment) to the crystal during the readout. Because the applied voltage will induce additional constant birefringence across the crystal with the associated background phase shift $\Gamma_0$, the response will become:

$$\Delta T(x, y) = \sin^2\left[\frac{\Gamma(x, y) + \Gamma}{2}\right] - \sin^2\left(\frac{\Gamma_0}{2}\right) \approx \frac{\sin\Gamma_0}{2}\Gamma(x, y) \approx C\frac{\sin\Gamma_0}{2}n(x, y) \quad (55)$$

Accordingly, in some embodiments, the transmission change ΔT(x,y) in the present invention is linearly proportional (or approximately linearly proportional) to the phase change Γ(x,y), and is also linearly proportional, or approximately linearly proportional, to the electron density n(x,y) associated with secondary electrons 78 (in contrast to quadratic proportionality).

Figure 22:
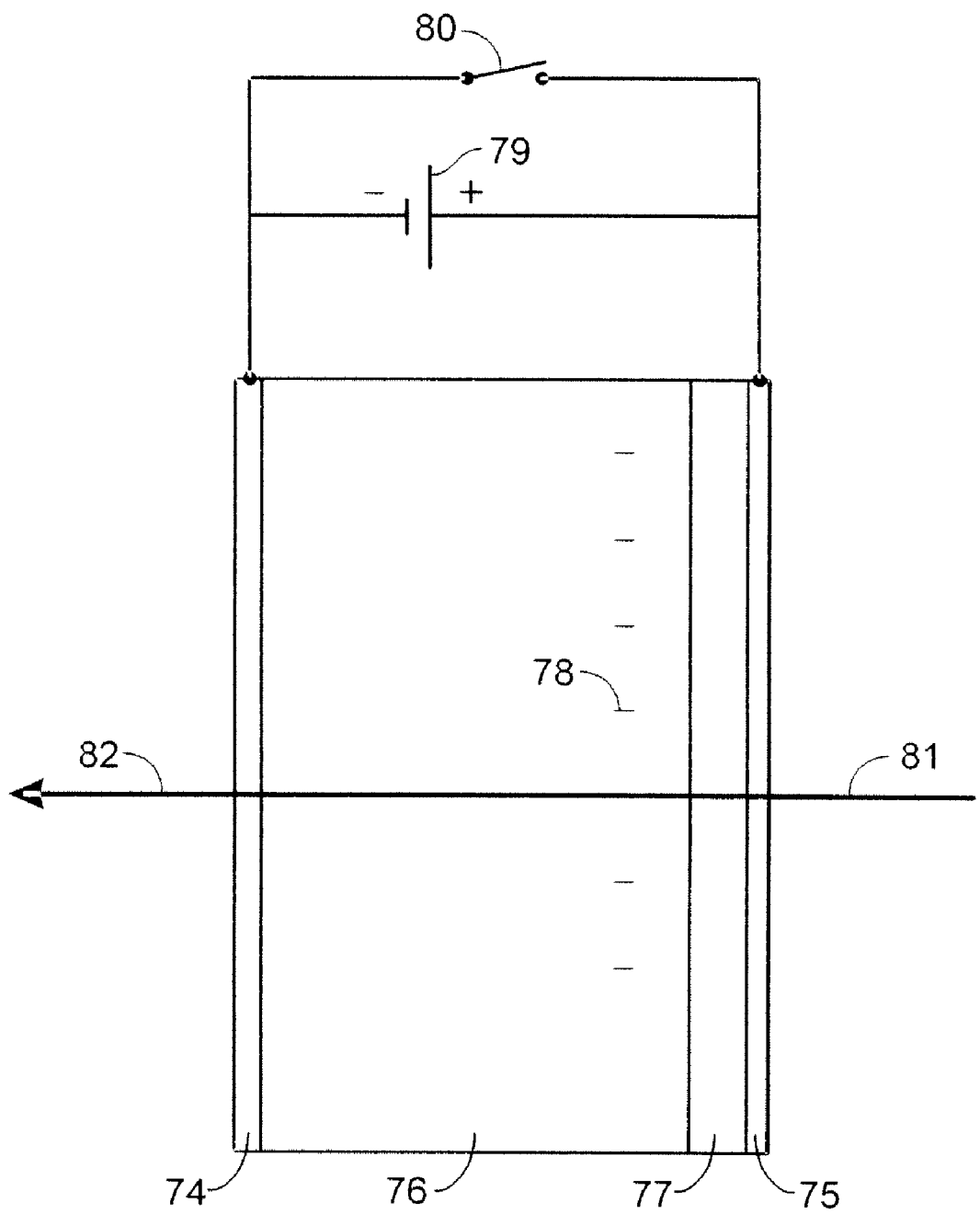
FIG. 22 is a diagram illustrating an example read-out structure for a transmission configuration.

Having thus described an example embodiment for optical read out with a reflective geometry, an alternative embodiment for a transmissive geometry is now described. FIG. 22 is a diagram illustrating an example read-out setup for a transmission configuration. Referring now to FIG. 22, this geometry is similar to the geometry of FIG. 19, with the following differences: the optical radiation 81 passes through the crystal 76 (again, BGO in one embodiment) and emerges on the other side as the modified optical radiation 82. In such embodiments, the electrode 74 is optically transparent such as, for example, a transparent conductive coating such as, for example, Indium Tin Oxide (ITO).

Figure 23:
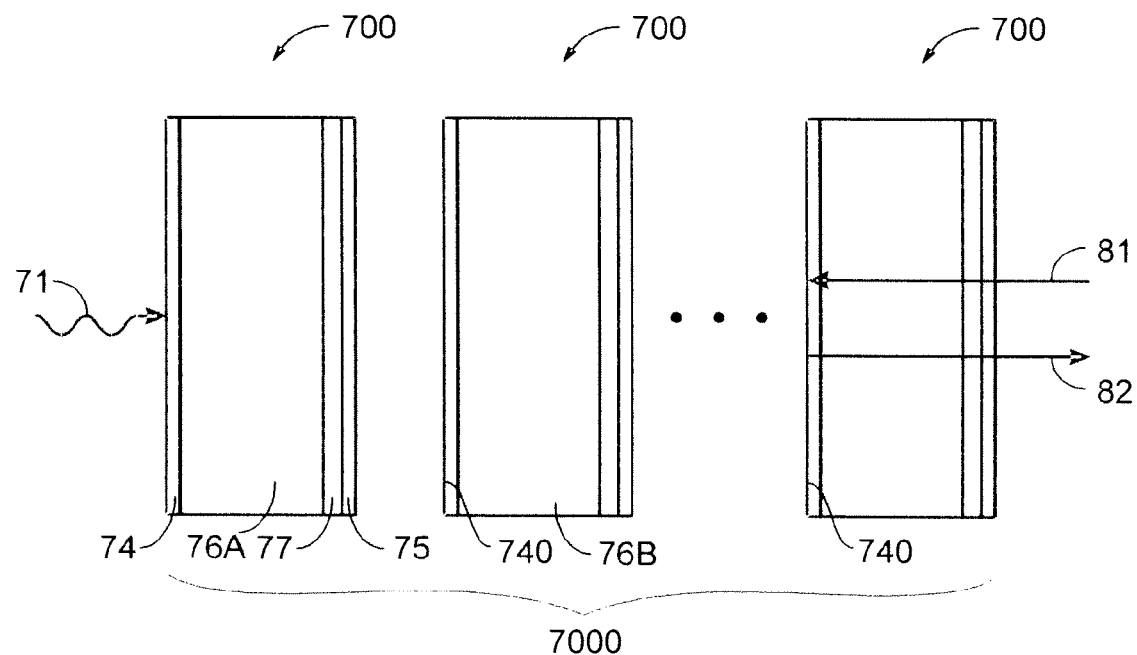
FIG. 23 is a diagram illustrating an example of a multilayer architecture.

In another embodiment of the quantum-imaging device, a multilayer architecture can be provided. FIG. 23 is a diagram illustrating an example of a multilayer architecture. Referring now to FIG. 23, the example quantum-imaging device includes a stack 7000 comprising a plurality of individual devices 700. In one embodiment, devices 700 each include a crystal 76, and can further include the sandwich of layers 74, 75, and 77 (electrodes and dielectric) surrounding crystal 76 as described in the above single crystal embodiments.

In this example multilayer architecture, a reflective architecture is shown. Accordingly, for the device 700 nearest the source of radiation 71, layer 74 is an optically reflective, electrically conductive layer. In subsequent devices 700 (other than the one nearest the source of radiation 71), the layer 74 is implemented as a layer 740 which is an optically transparent, electrically conductive layer. Accordingly, optical readout beam 81 can pass through the stack of elements 7000, and can be reflected from layer 74 of the element 700 nearest the source of radiation 71. This reflected beam is illustrated as the modified readout beam 82. As this example illustrates, this architecture can be implemented and operated in a manner similar to that shown in FIG. 20.

Figure 24:
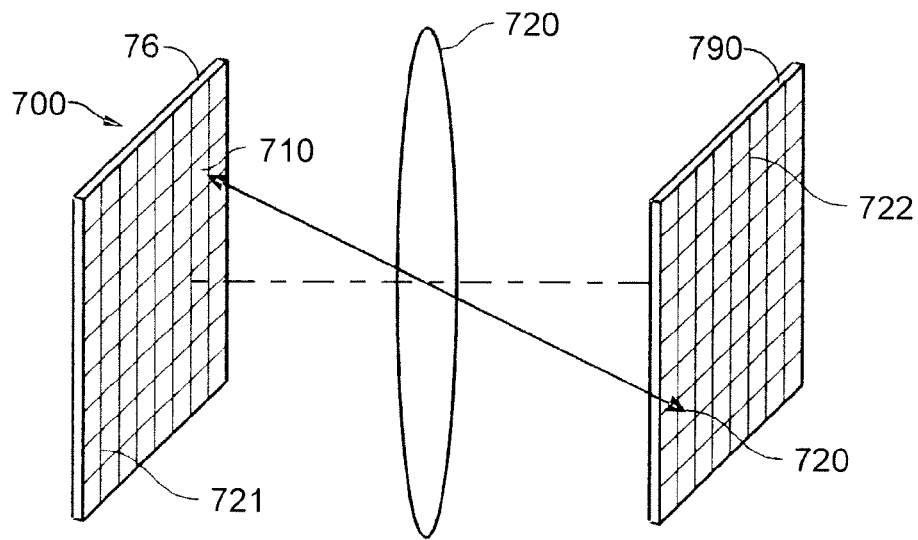
FIG. 24 is a diagram illustrating an example of pixel visualization.
Figure 25:
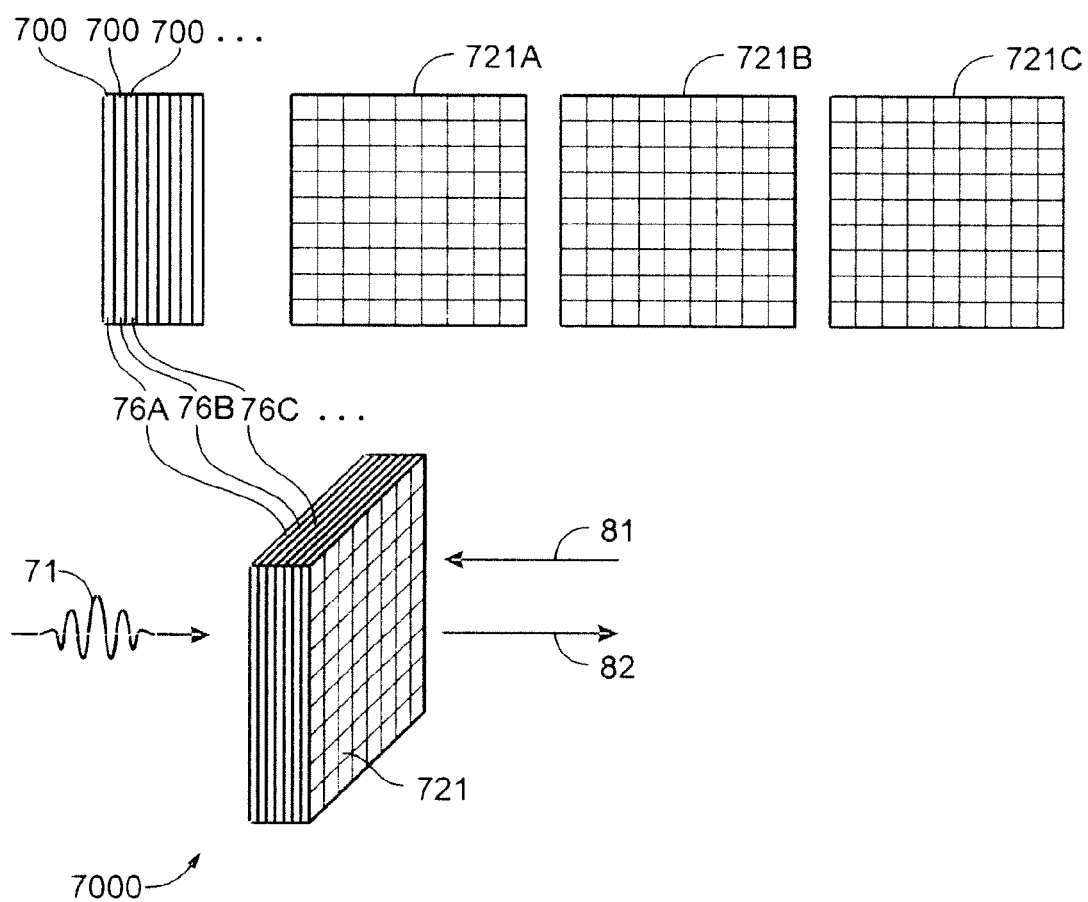
FIG. 25 is a diagram illustrating an example of a multilayer implementation.

In an optical imaging realization of this device 700, virtual pixels can be realized as illustrated in FIGS. 23-25. For example, with reference to FIG. 24, the device sandwich 700, including crystal 76, is imaged by a system of optical lenses 720 onto the optical detector 790. In one embodiment, optical detector 790 comprises a plurality of individual optical sensing pixels 722. This imaging scheme results in virtual pixels 721 for the device 700, such that each virtual pixel 721 is recorded on its corresponding pixel 720 in the optical detector 790.

In optical imaging realization of the multilayer device 7000 illustrated in FIG. 25, the BGO device 76 of each of the elements 700 in the stack 7000 is indicated as 76A, 76B, 76C, etc. The optical readout beam interrogates this stack of virtual pixels 721 described earlier having (x,y projections) 721A, 721B, 721C, etc., corresponding to sensing layers 76A, 76B, 76C, etc., respectively. These layer projections are imaged into single image projections, assuming a sufficiently large depth of focus for the optical imaging system. Therefore, the imaging system can read sequentially any of the single projections at a given time. In one embodiment, the entire stack can be read simultaneously, for example as described above. Then, the individual elements 700 in the stack 7000 wiped or erased, one (or more) at a time, and the stack read between wipe operations. For example, after the simultaneous read of all stacks, the first (e.g., the farthest) stack can be erased, and the remainder of the stack read. Then, the next layer erased and the stack read again, and so on until all but the last layer is erased. Accordingly, the clouds generated at varying absorption depths can be determined in each layer separately.

In other realizations of the quantum imaging device, the electron surface charges 78 are transported further through a photoelectric effect. Three realizations of the cold cathode quantum imaging read-out setup are described with reference to FIGS. 26-28 as devices 300, 318 and 319, respectively.

Figure 26:
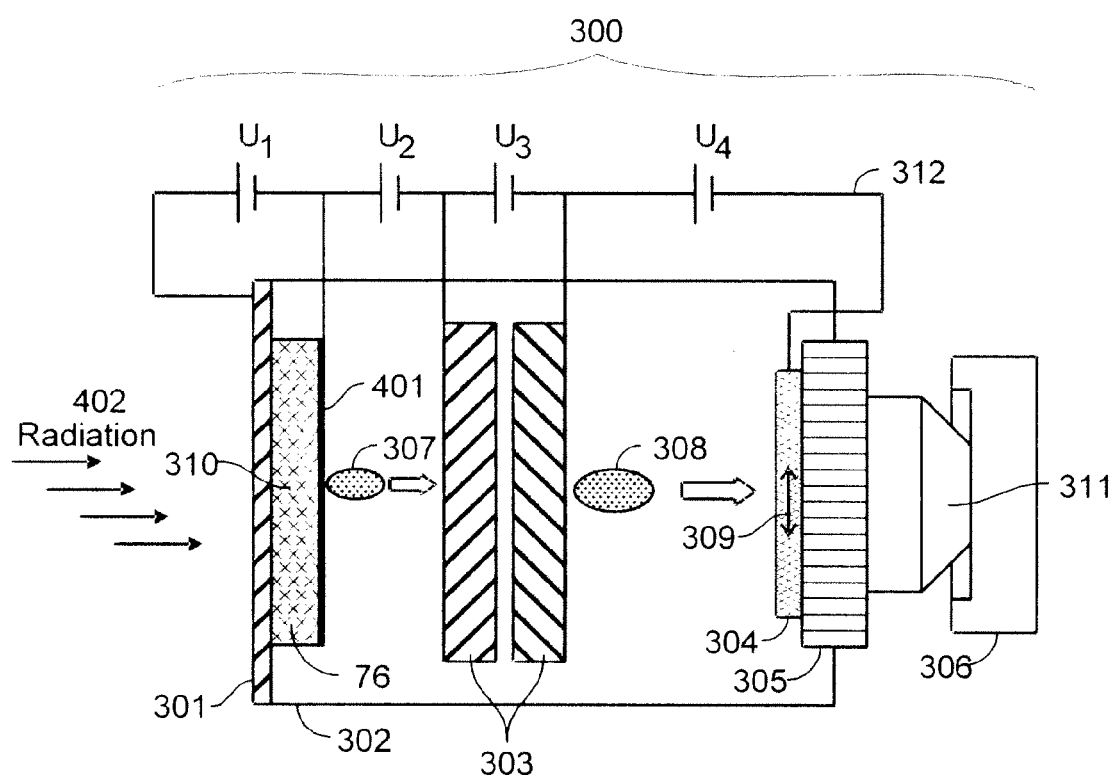
FIGS. 26-28 are diagrams illustrating three realizations of a cold cathode quantum imaging read-out process.

With reference to FIG. 26, radiation beam 402 is incident on device 300 which includes a vacuum envelope 302, a beryllium window 301, a sensing medium 76, with an optically transparent conductive surface 401, Microchannel Plates (MCPs) 303, phosphor screen 304, power supply 312, FO window 305, FO Taper 311 and image sensor 306. When radiation 402 is absorbed in sensing medium 76, the optical radiation 402 generates secondary electron cloud 310 in the sensing medium 76. The electron cloud 310 moves to the surface of the media 76 in the electric field, created by bias voltage U1 provided by Power Supply 312.

The electrical potential induced by the electron cloud on the surface 401 increases bias voltage U2 locally in the gap between surface 401 and input surface of the MCPs 303. This creates a condition of auto-electron emission of an electron cloud 307 from surface 401 in the areas covered by the electron cloud 310. Electron cloud 307 arrives at the input of the MCPs 303 in acceleration bias voltage U2. The number of electrons multiplies by factor of ~100,000 on MCPs 303 and goes to the phosphor screen as the magnified electron cloud 308 in accelerating voltage U4. On phosphor screen 304, electron cloud 308 creates visible image 309 of the cloud 308. Image 309 travels to CCD (or other detector) 306 through FO window 305 and FO taper 311.

Figure 27:
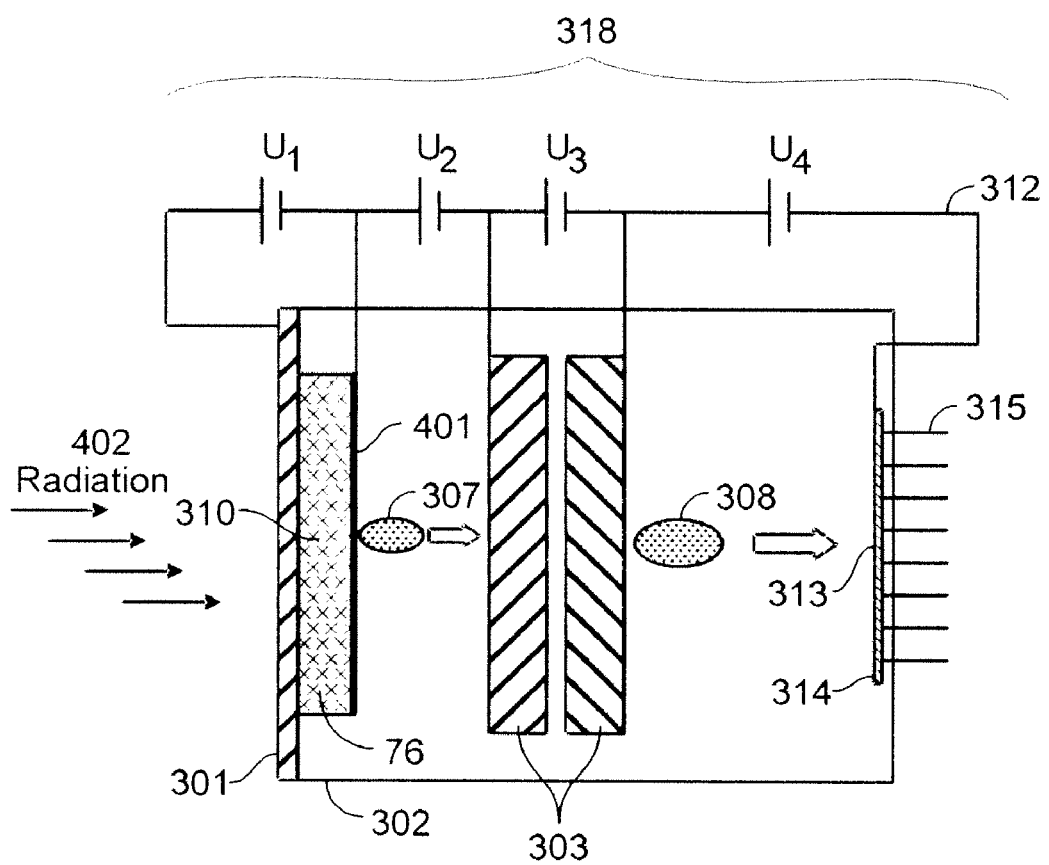

Another example realization, illustrated in FIG. 27, shows an example device 318 including a Vacuum Envelope 302, a Beryllium Window 301, a sensing medium 76, with an optically transparent conductive surface 401, Microchannel Plates (MCPs) 303, multielement anode matrix 314, and a Power Supply 312. When radiation beam 402 absorbed in sensing medium 76, the optical radiation 402 generates secondary electron cloud 310 in the sensing medium. The secondary electron cloud 310 moves to the surface of the media 76 in the electric field created by bias voltage U1 provided by Power Supply 312.

The electrical potential induced by the electron cloud 310 on the surface 401 increases the bias voltage U2 locally in the gap between surface 401 and input surface of the MCPs 303. This creates a condition for auto-electron emission 307 from surface 401 in the areas covered by electron cloud. Electron cloud 307 coming to input of the MCPs 303 in acceleration bias voltage U2. The number of electrons multiplies by factor of ~100,000 on MCPs 303 and travels to the multielement anode matrix 314 as a magnified electron cloud 308 in accelerating voltage U4. On multielement anode matrix 314 electron cloud 308 creates electronic image 313 of the cloud 310. Multichannel output 315 is readout electronic image 313 and sent to the computer for further processing or display.

Figure 28:
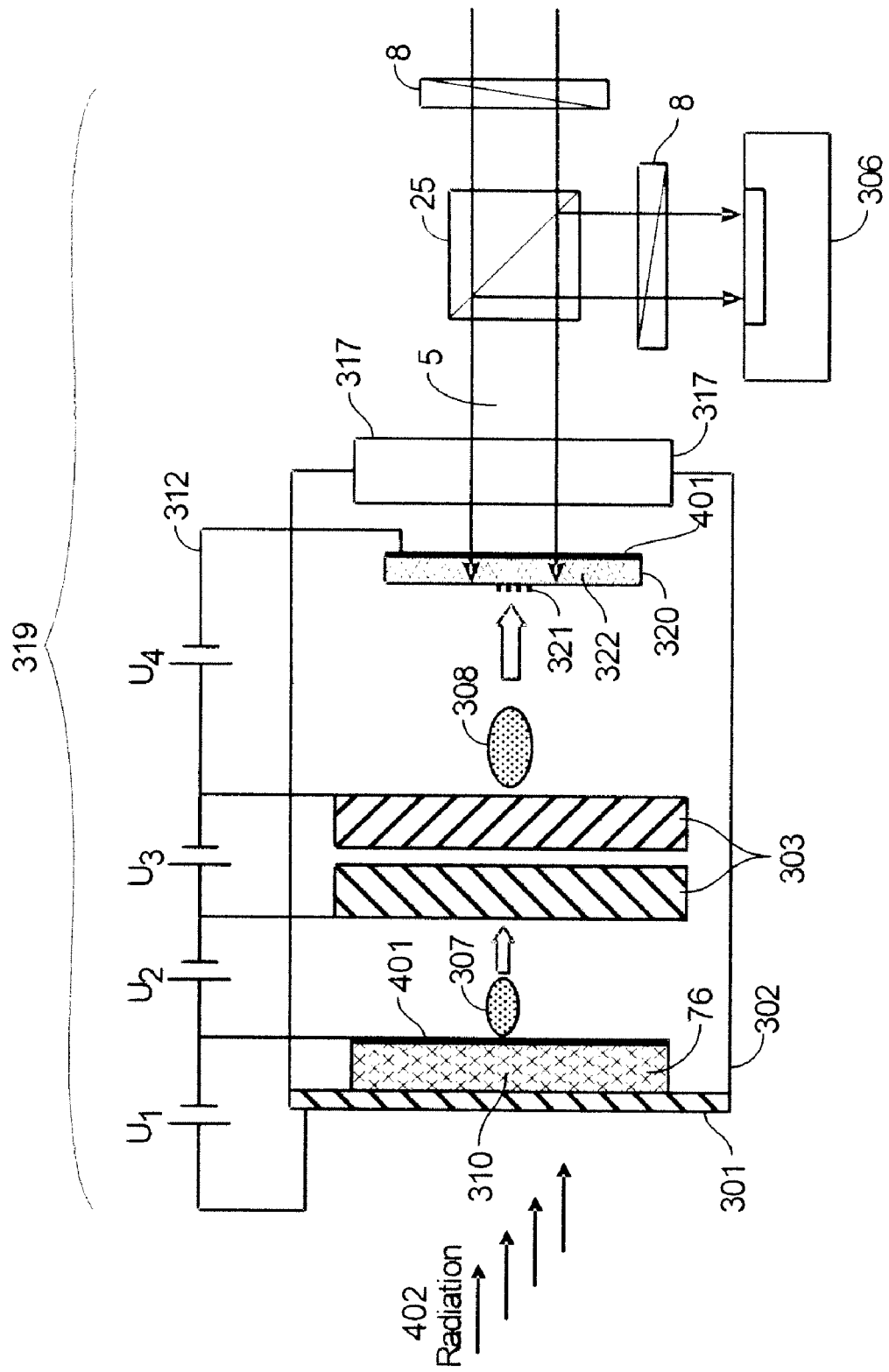

Yet another example embodiment, illustrated in FIG. 28, shows an example device 319 including a Vacuum Envelope 302, a Beryllium Window 301, a sensing medium 76, with an optically transparent conductive surface 401, Microchannel Plates (MCPs) 303, electro-optical crystal plate 320 with dielectric mirror 322, optically transparent conductive surface 401, Power Supply 312. When radiation beam 402 is absorbed in sensing medium 76, the optical radiation generates secondary electron cloud 310 in the sensing medium. The electron cloud 310 moves to the surface of the media 76 in the electric field, created by bias voltage U1 provided by Power Supply 312.

The electrical potential induced by electron cloud on the surface 401 increases bias voltage U2 locally in the gap between surface 401 and input surface of the MCPs 303. This creates a condition for auto-electron emission 307 from surface 401 in the areas covered by electron cloud. Electron cloud 307 moves to input of the MCPs 303 in acceleration bias voltage U2. The number of electrons multiplies by factor of ~100,000 on MCPs 303 and moves to the transparent dielectric layer 316 of the electro-optical crystal plate 320 as magnified electron cloud 308 in accelerating voltage U4.

On the transparent dielectric layer 316 of the electro-optical crystal plate 320, electron cloud 308 creates electronic image 321 of the cloud 310. This electronic image modulates electro-optical properties of the electro-optical crystal plate 320, which in turn modulates direct optical readout beam 5 passing through polarizing component 8, beam splitter 25, and electro-optical crystal plate 320, reflects from the dielectric mirror 322 and moves through beam splitter 25 and polarizing component 8 toward CCD 306 for a readout of cloud image 310.

As described above, in various embodiments, a beam of light is transmitted through (in a transmissive or reflective mode) the crystal material and dielectric, thereby altering the characteristics of the beam of light as a result of the secondary electron cloud. The altered light is detected by an image sensor (CCD or otherwise) and the resultant electrical signal can be processed to determine the 'image' of the secondary electron cloud(s) caused by impinging photons. From this, photon counting or photon spectroscopy can be accomplished through further processing.

The imaging processing can be implemented using modules including hardware, software, or a combination thereof. In one embodiment, these software elements can be implemented to operate with a computing or processing module capable of carrying out the functionality described with respect thereto.

In one embodiment, a quantum imaging device, is provided that includes a detector comprising a detector material, wherein a photon impinging on the detector creates a secondary electron cloud; and a dielectric layer disposed on the detector and configured to store the charge associated with the secondary electron cloud. First and second electrodes, can be included wherein the first electrode is disposed on the dielectric layer and the second electrode is disposed on an end of the detector opposite the end on which the dielectric layer is disposed. In one embodiment, the first electrode is optically transparent and the second electrode is optically reflective. In another embodiment, the first and second electrodes are optically transparent. In some embodiments, the first and second electrodes comprise indium tin oxide.

In one embodiment, the detector-dielectric interface is configured to store charge generated by electrons decomposed from a photon impinging on the detector material. A voltage source can be included and configured to provide a voltage potential between the first and second electrodes, wherein the applied voltage causes electrons to move through the detector and be stored at the dielectric material.

In further embodiments, a second detector material disposed can be on the dielectric layer and a second dielectric layer disposed on the second detector material. In still further embodiments, a plurality of layers of detector material and dielectric material, and configured such that the device is arranged in a stack of alternating layers of detector material and dielectric material.

The quantum imaging device can be further configured in some embodiments to include a light source positioned to pass a beam of light through the dielectric layer and the detector material; and an image sensor configured to receive the beam of light after it passes through the dielectric layer; wherein the beam of light passing through the dielectric layer is altered by the secondary electron cloud stored at the dielectric material. A processing device can be included and configured to receive image data from the image sensor and to determine properties of the photon based on the properties of the beam altered by the secondary electron cloud generated by the photon. A visualization device such as a camera or monitor can also be provided. Processing algorithms can also be included such that where plurality of secondary electron clouds overlap one another, the processing device is further configured to determine the energy of a photon by mathematically separating the electron clouds. The processing device can be configured to measure the surface charge of the secondary electron cloud and to calculate approximate energy value of the photon that resulted in the secondary electron cloud.

A first polarizer can be included and disposed between the light source and the detector material and configured to orient the polarization of the beam of light in a first direction, and a second polarizer included and disposed between the detector material and the image sensor and configured to pass only the electric field of the beam of light altered by the secondary electron cloud oriented in a second direction. In one embodiment, the first and second polarizers are oriented such that a portion of the beam altered by the charge carriers in the dielectric layer passes to the image sensor, and substantially all of the unaltered beam is not passed. In another embodiment, a quarter wave plate is included and disposed between the detector material and the second polarizer. The quarter wave plate can be configured with an orientation relative to the polarizers to cause the intensity of the beam impinging on the image sensor to vary at least approximately linearly with phase rotation.

In yet another embodiment, a quantum imaging device includes a detector material having first and second surfaces, and a storage layer disposed on the first surface of the detector material, wherein a photon impinging on the detector material at the second surface creates a spatial electron pattern that is stored in the storage layer disposed on the first surface such that the spatial electron pattern alters characteristics of optical radiation passing through the storage layer.

In still another embodiment, a quantum imaging system includes: a crystal detector comprising a crystal material, wherein a photon impinging on the crystal creates a secondary electron cloud; a dielectric layer disposed on the crystal and configured to store the charge associated with the secondary electron cloud; an optical source configured to transmit a beam to the crystal; and an image sensor configured to receive the beam after having been transmitted through the crystal; wherein the polarization of the optical beam is altered by the secondary electron cloud.

In still further embodiments, a method of measuring energy of a photon, includes passing an optical beam through a detector material into which the photon has been absorbed, wherein a spatial charge distribution resulting from a secondary electron cloud created by photoabsorbtion of the photon changes the phase of the optical beam passing through the detector material, creating a modified optical beam; and detecting the modified optical beam using an image sensor. In some embodiments, the measured photons have a wavelength $\leq 1$ nm. The energy can be measured in accordance with radius information of the charge distribution according to $A_0 = aE_0^m$, where a is a proportionality constant, $E_0$ is the photon energy, and $A_0$ is the radius of the charge distribution resulting from photoabsorption, for a range of m from 2-4.

In yet other embodiments, a method of detecting a photon having a wavelength $\leq 1$ nm, includes photoabsorbing the photon by a birefringent detector, resulting in generation of a secondary electron cloud, and performing an optical read-out of a charge distribution resulting from the secondary electron cloud.

In still further embodiments, a method of visualizing quasi-monoenergetic lines is provided using a multi-layer detector, wherein an given layer is used to measure a given isotope line, such that the packing coefficient for a line as a value from 0.3-0.5, and the photoabsorbed photon number density is maximized for a given line at the given layer.

In other embodiments, a method of ionizing radiation detection, includes calculating approximate energy values of photons impinging on a detector material; selecting an attenuation amount to adjust the packing coefficient of secondary electron clouds generated by the photons impinging on the detector; and measuring the secondary electron clouds to determine the energy of the photons impinging on the detector.

In some embodiments, calculating approximate energy values comprises passing a beam through a first absorption channel having a first attenuation value and a detector; passing the beam through a second absorption channel having a second attenuation value and a detector; computing a ratio of fluences resulting from the absorption channels; using the computed ratio of fluences to compute the incident photon numbers or the photon energies.

The incident photon numbers, $N_1$, can be computed according to the ratio of fluences as given by $$N_1 = \frac{E_1'}{E_1} \frac{2}{1 - e^{\mu'(E_1)\rho\Delta x_0}}.$$

The photon energies, $E_1$, can be computed based on the relationship $$\mu(E_1) = \frac{1}{\rho\Delta x_1} \ln\frac{E_1'}{E_2'}.$$

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of measuring energy of a photon, comprising passing an optical beam through a detector material into which the photon has been absorbed, wherein a spatial charge distribution resulting from a secondary electron cloud created by photoabsorbtion of the photon changes the phase of the optical beam passing through the detector material, creating a modified optical beam; and detecting the modified optical beam using an image sensor.

2. The method of claim 1, wherein the photon is a photon having a wavelength $\leq 1$ nm.

3. The method of claim 1, further comprising recording the image of the charge distribution created by the photon with an image capture device.

4. The method of claim 1, wherein energy is measured in accordance with radius information of the charge distribution according to $A_0 = aE_0^m$, where a is a proportionality constant, $E_0$ is the photon energy, and $A_0$ is the radius of the charge distribution resulting from photoabsorption, for a range of m from 2-4.

5. A method of detecting a photon having a wavelength $\leq 1$ nm, comprising photoabsorbing the photon by a birefringent detector, resulting in generation of a secondary electron cloud, and performing an optical read-out of a charge distribution resulting from the secondary electron cloud.

6. A quantum imaging device, comprising:
a detector comprising a birefringent detector material, wherein ionizing radiation impinging on the detector creates a secondary electron cloud; and
a dielectric layer disposed on the detector and configured to store the charge associated with the secondary electron cloud.

7. The quantum imaging device of claim 6, further comprising first and second electrodes, the first electrode disposed on the dielectric layer and the second electrode disposed on an end of the detector opposite the end on which the dielectric layer is disposed.

8. The quantum imaging device of claim 7, wherein the first electrode is optically transparent and the second electrode is optically reflective.

9. The quantum imaging device of claim 7, wherein the first and second electrodes are optically transparent.

10. The quantum imaging device of claim 7, wherein the first and second electrodes comprise indium tin oxide.

11. The quantum imaging device of claim 7, wherein the dielectric material is configured to store charge generated by electrons decomposed from ionizing radiation impinging on the detector material.

12. The quantum imaging device of claim 7, further comprising a voltage source configured to provide a voltage potential between the first and second electrodes, wherein the applied voltage causes electrons to move through the detector and be stored at the dielectric material.

13. The quantum imaging device of claim 6, wherein the detector material comprises BGO or BSO.

14. The quantum imaging device of claim 6, further comprising a second detector material disposed on the dielectric layer and a second dielectric layer disposed on the second detector material.

15. The quantum imaging device of claim 6, comprising a plurality of layers of detector material and dielectric material, and configured such that the device is arranged in a stack of alternating layers of detector material and dielectric material.

16. The quantum imaging device of claim 15, further comprising a plurality of electrodes, wherein first and second electrodes are provided for each detector-dielectric layer pair.

17. The quantum imaging device of claim 16, wherein an electrode disposed on the detector material at a first end of the device is reflective.

18. The quantum imaging device of claim 16, wherein the first and second electrodes are optically transparent.

19. The quantum imaging device of claim 7, further comprising:
a light source positioned to pass a beam of light through the dielectric layer and the detector material; and
an image sensor configured to receive the beam of light after it passes through the dielectric layer;
wherein the beam of light passing through the dielectric layer is altered by the secondary electron cloud stored at the dielectric material.

20. The quantum imaging device of claim 19, further comprising a processing device configured to receive image data from the image sensor and to determine properties of the ionizing radiation based on the properties of the beam altered by the secondary electron cloud generated by the ionizing radiation.

21. The quantum imaging device of claim 20, wherein the spatial distribution of the altered beam is proportional to the surface charge density of the secondary electron cloud.

22. The quantum imaging device of claim 21, wherein a plurality of secondary electron clouds are separate from one another.

23. The quantum imaging device of claim 21, wherein a plurality of secondary electron clouds overlap one another and the processing device is further configured to determine the energy of the ionizing radiation by mathematically separating the electron clouds.

24. The quantum imaging device of claim 20, wherein the processing device is configured to measure the surface charge of the secondary electron cloud and to calculate approximate energy value of the ionizing radiation that resulted in the secondary electron cloud.

25. The quantum imaging device of claim 19, wherein the image sensor is coupled to a data processing system or a camera to provide an image display of the secondary electron cloud.

26. The quantum imaging device of claim 19, wherein the alteration of the beam of light passing through the secondary electron cloud comprises changing the polarization of the electric field of the optical beam.

27. The quantum imaging device of claim 19, further comprising:
A first polarizer disposed between the light source and the detector material and configured to orient the polarization of the beam of light in a first direction;
A second polarizer disposed between the detector material and the image sensor and configured to pass only the electric field of the beam of light altered by the secondary electron cloud oriented in a second direction.

28. The quantum imaging device of claim 27, wherein the first and second polarizers are oriented such that a portion of the beam altered by the charge carriers in the dielectric layer passes to the image sensor, and substantially all of the unaltered beam is not passed.

29. The quantum imaging device of claim 27, further comprising a quarter wave plate disposed between the detector material and the second polarizer.

30. The quantum imaging device of claim 29, wherein the quarter wave plate is configured with an orientation relative to the polarizers to cause the intensity of the beam impinging on the image sensor to vary at least approximately linearly with phase rotation.

31. The quantum imaging device of claim 19, wherein the spatial distribution of the altered beam is proportional to the surface charge density of the secondary electron cloud.

32. The quantum imaging device of claim 6, wherein the ionizing radiation comprises radiation from an x-ray source or from an $\alpha$, $\beta$, or $\gamma$ isotope.

33. A quantum imaging device, comprising a detector material having first and second surfaces, and a storage layer disposed on the first surface of the detector material, wherein ionizing radiation impinging on the detector material at the second surface creates a spatial electron pattern that is stored in the storage layer disposed on the first surface such that the spatial electron pattern alters characteristics of optical radiation passing through the storage layer.

34. A quantum imaging system, comprising:
a detector comprising a detector material, wherein ionizing radiation impinging on the detector creates a secondary electron cloud;
a dielectric layer disposed on the detector and configured to store the charge associated with the secondary electron cloud;
an optical source configured to transmit a beam to the detector; and
an image sensor configured to receive the beam after having been transmitted through the detector;
wherein the polarization of the optical beam is altered by the secondary electron cloud.

35. The quantum imaging system of claim 34, further comprising polarization components disposed in a path of the beam and configured to achieve an optical spatial pattern at the image sensor having an intensity distribution linearly proportional to the surface charge density of the secondary electron cloud.

36. The quantum imaging system of claim 35, wherein the polarization components are detuned from a state of minimum transmission.

37. The quantum imaging system of claim 35, further comprising a voltage source coupled to the detector and dielectric layer and wherein the linear response is achieved by applying electric voltage to the structure when the secondary electron cloud is read by the beam.

38. The quantum imaging device of claim 33, wherein the photon originates from an x-ray source or from an $\alpha$, $\beta$, or $\gamma$ isotope.

39. The quantum imaging device of claim 33, wherein the ionizing radiation comprises radiation from an x-ray source or from an $\alpha$, $\beta$, or $\gamma$ isotope.

40. The quantum imaging device of claim 34, wherein the ionizing radiation comprises radiation from an x-ray source or from an $\alpha$, $\beta$, or $\gamma$ isotope.

41. A quantum imaging device, comprising:
a vacuum envelope having an input window transparent to ionizing radiation;
a detector comprising birefringent detector material having a first and second surface and being oriented such that the first surface is adjacent the input window, and wherein ionizing radiation impinging on the detector creates a secondary electron cloud in the detector;
a power supply configured to bias the detector such that the secondary electron cloud moves to and is emitted from the second surface of the detector;
an electron multiplier disposed in the vacuum envelope and configured to receive the secondary electron cloud emitted from the second surface of the detector and to multiply the number of electrons in the secondary electron cloud emitted from the second surface of the detector, thereby generating a multiplied electron cloud; and
an optical detector disposed at least partially within the vacuum envelope and positioned to receive the multiplied electron cloud and configured to generate a visible image representing the electron cloud.

42. The quantum imaging device of claim 41, wherein the power supply is further configured to provide a bias voltage between the detector and the electron multiplier.

43. The quantum imaging device of claim 41, wherein the power supply is further configured to provide a bias voltage between the electron multiplier and the optical detector.

44. The quantum imaging device of claim 41, wherein the electron multiplier comprises microchannel plates.

45. The quantum imaging device of claim 41, wherein the optical detector comprises a phosphor screen, a multi-element anode or an electro-optical crystal.

46. The quantum imaging device of claim 41, further comprising an image sensor configured to capture the visible image representing the electron cloud.

47. The quantum imaging device of claim 41, wherein the ionizing radiation comprises radiation from an x-ray source or from an $\alpha$, $\beta$, or $\gamma$ isotope.

48. A quantum imaging system, comprising:
a detector comprising a detector material, wherein ionizing radiation impinging on the detector creates a secondary electron cloud; and
a detection system configured to generate an optical image representing the secondary electron cloud.

49. The quantum imaging system of claim 48, further comprising a capture medium disposed on the detector and configured to store the charge associated with the secondary electron cloud, and an optical source configured to transmit a beam to the detector; and wherein the detection system comprises an image sensor configured to receive the beam after having been transmitted through the detector, wherein the polarization of the optical beam is altered by the secondary electron cloud.

50. The quantum imaging system of claim 48, further comprising:
a power supply configured to bias the detector such that the secondary electron cloud moves to and is emitted from the detector for detection by the detection system.

51. The quantum imaging system of claim 50, further comprising an electron multiplier configured to receive the secondary electron cloud emitted from the detector, to multiply the number of electrons in the secondary electron cloud emitted from the detector, thereby generating a multiplied electron cloud and to pass the multiplied electron cloud to the detection system.

52. The quantum imaging system of claim 51, wherein the detection system comprises an optical detector positioned to receive the multiplied electron cloud and configured to generate a visible image representing the electron cloud.

* * * * *